United States Patent
Nagasawa et al.

(10) Patent No.: US 12,383,384 B2
(45) Date of Patent: Aug. 12, 2025

(54) JOINING STRUCTURE FOR PROCESSING

(71) Applicant: TOKUYAMA DENTAL CORPORATION, Tokyo (JP)

(72) Inventors: Yuko Nagasawa, Tokyo (JP); Masaaki Ushioda, Tokyo (JP)

(73) Assignee: TOKUYAMA DENTAL CORPORATION, Tokyo (JP)

( * ) Notice: Subject to any disclaimer, the term of this patent is extended or adjusted under 35 U.S.C. 154(b) by 1077 days.

(21) Appl. No.: 17/299,307

(22) PCT Filed: Nov. 14, 2019

(86) PCT No.: PCT/JP2019/044661
§ 371 (c)(1),
(2) Date: Jun. 3, 2021

(87) PCT Pub. No.: WO2020/137224
PCT Pub. Date: Jul. 2, 2020

(65) Prior Publication Data
US 2022/0054241 A1   Feb. 24, 2022

(30) Foreign Application Priority Data

Dec. 25, 2018   (JP) ................................ 2018-241428

(51) Int. Cl.
*A61C 13/12*   (2006.01)
*A61C 13/00*   (2006.01)

(52) U.S. Cl.
CPC .......... *A61C 13/12* (2013.01); *A61C 13/0004* (2013.01); *A61C 13/0022* (2013.01)

(58) Field of Classification Search
None
See application file for complete search history.

(56) References Cited

U.S. PATENT DOCUMENTS 4,935,635 A   6/1990   O'Harra
6,660,400 B1   12/2003   Hintersehr
(Continued)

FOREIGN PATENT DOCUMENTS

CN   104470462 A   3/2015
DE   102004020369 A1   11/2005
(Continued)

OTHER PUBLICATIONS

Machine translation of WO2011029615A1 translated via EPO on May 1, 2024 (Year: 2011).*

(Continued)

*Primary Examiner* — Elizabeth Collister
(74) *Attorney, Agent, or Firm* — HAUPTMAN HAM, LLP

(57) ABSTRACT

Provided is a joining structure for processing which joins reliably and without misalignment a dental CAD/CAM block to be machined to a block holder for holding same onto a processing device. An engagement protrusion is formed on a block-side joint surface of a block to be processed, and an engagement recess is formed on a holder-side joint surface of a block holder. An adhesive retaining space is formed therebetween. An adhesive is applied thereto, and the engagement protrusion and the engagement recess are engaged and joined. The engagement protrusion formed on the block to be processed is rectangular or substantially rectangular. If the engagement protrusion extends from the front surface towards the back surface of the block to be processed, the protrusion can removed from a mold (shown in FIGS. 5A and 5B) by moving the protrusion in the direction of the arrow (shown in FIGS. 5A and 5B).

3 Claims, 12 Drawing Sheets

(56) References Cited

U.S. PATENT DOCUMENTS

| | | |
|---|---|---|
| 2003/0073394 A1* | 4/2003 | Reidt ................ A61C 13/0022 433/201.1 |
| 2007/0172787 A1 | 7/2007 | Fornoff |
| 2009/0075238 A1* | 3/2009 | Galehr ............... A61C 13/0022 433/213 |
| 2010/0297580 A1 | 11/2010 | Niewiadomski |
| 2011/0042880 A1 | 2/2011 | Konrad et al. |
| 2012/0284000 A1 | 11/2012 | Nilsson |
| 2012/0288825 A1 | 11/2012 | Nordin et al. |
| 2013/0288026 A1 | 10/2013 | Johnson |
| 2015/0164622 A1 | 6/2015 | Odanaka et al. |
| 2015/0182315 A1* | 7/2015 | Okada ................ A61C 13/0006 264/16 |
| 2016/0228222 A1 | 8/2016 | Rolf et al. |
| 2018/0078349 A1 | 3/2018 | Isobe et al. |

FOREIGN PATENT DOCUMENTS

| | | | |
|---|---|---|---|
| DE | 202009018693 U1 | 10/2012 | |
| EP | 1068839 A2 | 1/2001 | |
| EP | 3395289 A1 | 10/2018 | |
| JP | 2007222225 A | 9/2007 | |
| WO | 2009154301 A1 | 12/2009 | |
| WO | WO-2011029615 A1 * | 3/2011 | ......... A61C 13/0022 |
| WO | 2012087997 A1 | 6/2012 | |

OTHER PUBLICATIONS

Extended European Search Report in EP Application No. 19902110.6 dated Jul. 29, 2022. 5pp.

Office Action in CN Application No. 201980070704.7, dated Nov. 8, 2021. 9pp.

Office Action in RU Application No. 2021118355, dated Oct. 29, 2021. 14pp.

* cited by examiner

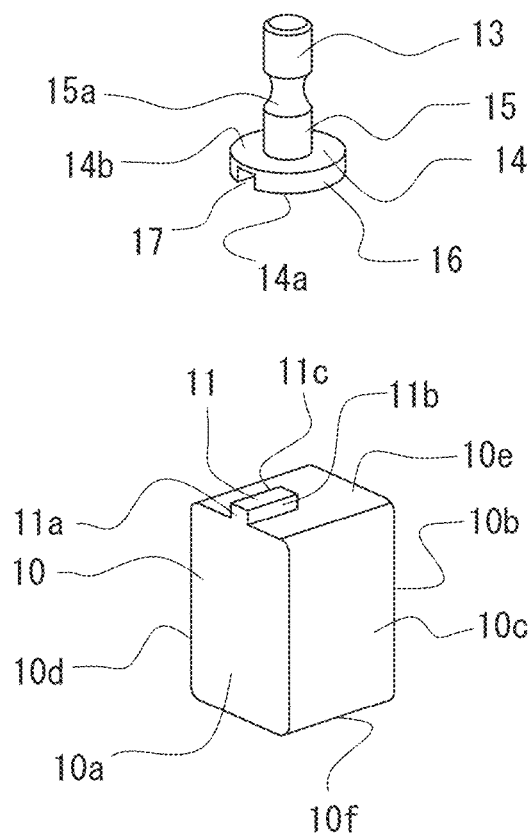
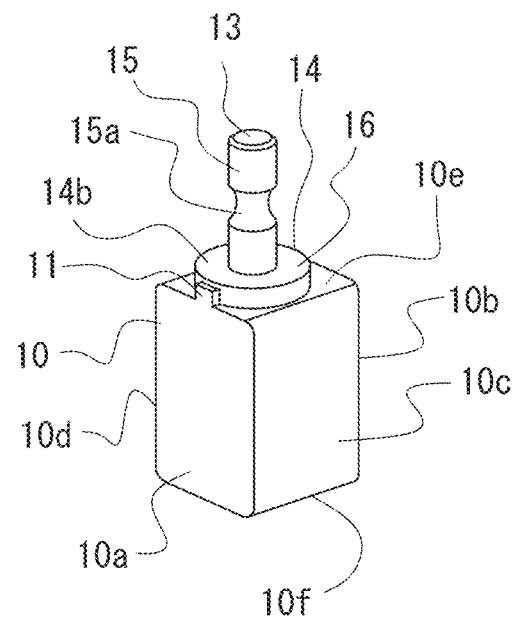
FIG. 1A
FIG. 1B
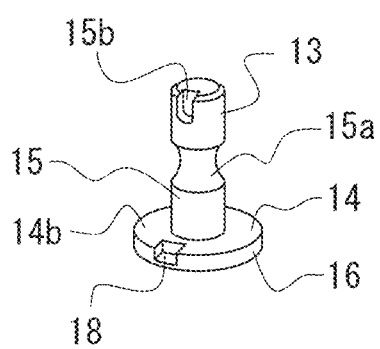
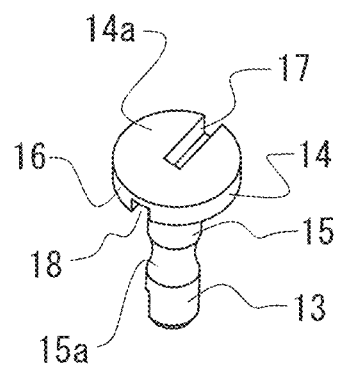
FIG. 2A
FIG. 2B

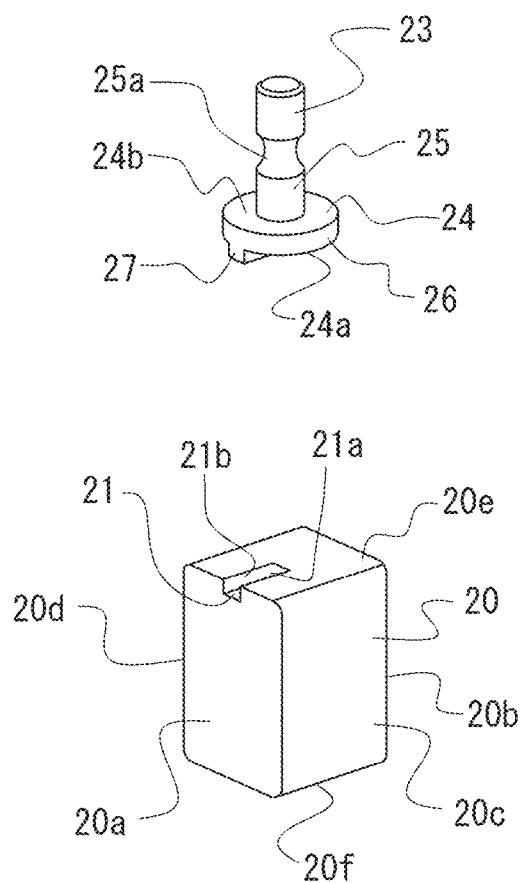
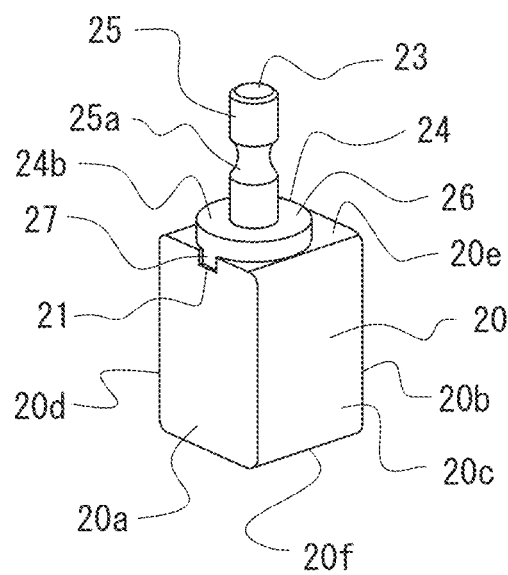
FIG. 3A  FIG. 3B
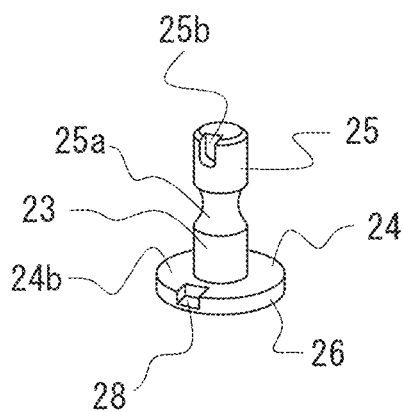
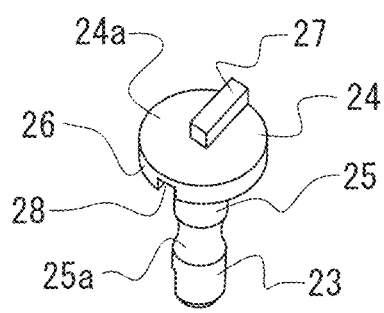
FIG. 4A  FIG. 4B

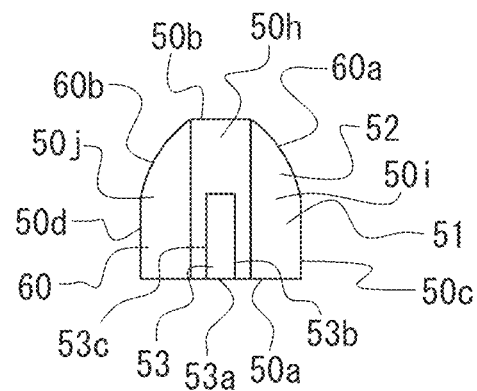
FIG. 14
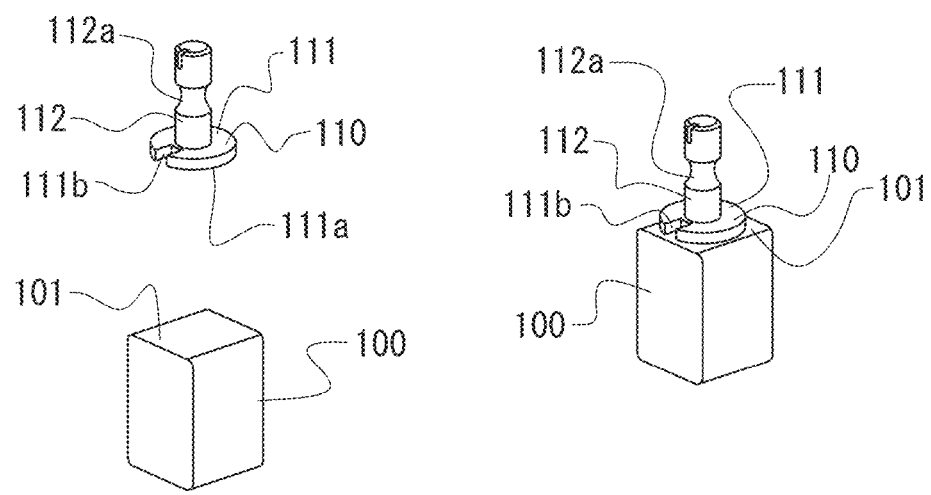
FIG. 15A
FIG. 15B

JOINING STRUCTURE FOR PROCESSING

CROSS REFERENCE TO RELATED APPLICATIONS

This is a U.S. national stage of application No. PCT/JP2019/044661, filed on Nov. 14, 2019. Priority under 35 U.S.C. § 119(a) and 35 U.S.C. § 365(b) is claimed from Japanese Patent Applications No. 2018-241428 filed on Dec. 25, 2018.

TECHNICAL FIELD

The present invention relates to a joining structure of a dental CAD/CAM block, which is to be cut and processed into a dental prosthesis such as a crown, a partial crown, a denture and the like, and a block holder integrally joined to the dental CAD/CAM block.

BACKGROUND ART

A dental prosthesis as a dental product used for dental treatment may be molded by casting a metal material such as gold, silver, titanium, palladium alloy, etc. or formed by cutting a dental CAD/CAM block formed from ceramics or hybrid resin or the like. The hybrid resin is a composite material in which an inorganic filler is dispersed in a resin matrix with high density.

With the development of digital image technology and computer processing technology in recent years, it has come to widely use CAD/CAM systems, as disclosed in PTL 1 for example, in which dental CAD/CAM blocks are cut to dental prostheses based on images taken in the oral cavity with use of CAD/CAM equipment based on computer-aided design (CAD) and computer aided manufacturing (CAM) technology A dental CAD/CAM block provided in a cutting machine to be cut needs to be held at a predetermined position with respect to the cutting machine. For this reason, a metal block holder called a mounting post, a frame, a connection pin, etc. and the dental CAD/CAM block are joined via an adhesive, and the block holder is fixed to the block fixing tool and is attached to the cutting machine. As shown in PTL 1, the dental CAD/CAM block may be referred to as a dental mill blank or the like, and may have a structure in which a plurality of layers having different properties such as color tone and transparency are laminated in order to perform so-called aesthetic repair. Such a structure will be also referred to as a "laminated block".

The dental CAD/CAM block is formed into a rectangular parallelepiped or a substantially rectangular parallelepiped, as described in PTL 1 to PTL 3 for example, and its one face is a plane-shaped block-side joint face. The block holder is provided with a plane serving as a holder-side joint face and a columnar holding support portion. The holder-side joint face is joined to the block-side joint face of the dental CAD/CAM block by an adhesive. The holding support portion is available in various shapes. PTL 3 discloses a securing shaft having essentially polygonal shape, the bottom face of which is a holder-side joint face is formed by chamfer with a fixing face for fixing in a housing of a cutting machine. PTL 1 and PTL 2 disclose structures each comprising a base body having a surface as the holder-side joint face and a columnar body elected on the base body at a face opposite to the holder-side joint face of the base body wherein a central portion of the columnar body is reduced in diameter, and a chuck portion for fixing to the block fixing tool is formed in the reduced diameter portion.

An adhesive is applied to either or both of the block joint face and the holder joint face, and the block holder is placed in a predetermined position on the block-side joint face of the dental CAD/CAM block. Then, when the adhesive is cured, a joint body in which these dental CAD/CAM blocks and the block holder are integrated is produced.

CITATION LIST

Patent Literature

[PTL 1] JP 2016-535610 A: US 2016/0228222 A1
[PTL 2] JP 2018-42895 A: US 2018/0078349 A1
[PTL 3] JP 2011-41809 A: US 2011/0042880 A1

SUMMARY OF INVENTION

Technical Problem

However, when joining by the above-mentioned method on an industrial scale, the joint body may be moved before the adhesive is cured in order to perform the joining efficiently. At this time, even if the block holder is moved carefully so as not to cause a misalignment with respect to the dental CAD/CAM block, such as moving it as quietly as possible while keeping it horizontal, there is a risk of the misalignment outside the allowable range. Due to this misalignment, it was inevitable that defective products that were out of specification would occur at a certain rate. In particular, when the laminated block is used to obtain a dental prosthesis having a highly aesthetic color tone pattern, it is needs to be positioned in high accuracy so that a layer having a predetermined color tone is positioned at a predetermined position, and then cutting is performed. The position when fixing the dental CAD/CAM block to the cutting machine may be slightly deviated, and the desired color tone pattern may not be obtained. Therefore, the allowable range of misalignment is extremely narrow, and the effect of the misalignment on productivity is greater.

Therefore, an object of the present invention is to provide a joining structure for processing that can reduce the occurrence rate of such defective products.

Solution to Problem

In order to solve the above problems, according to the first aspect of the present invention, a joining structure for processing comprises: a dental CAD/CAM block to be processed by a machine for producing a dental product and a block holder joined to the dental CAD/CAM block to hold it and to fix it to a cutting machine, further comprising: an engaging part formed on a first joint face that is either one of a joint face of the dental CAD/CAM block and a joint face of the block holder; an engagement reception part formed on a second joint face that is the other of the joint face of the dental CAD/CAM block and the joint face of the block holder; and an adhesive holding space configured to hold an adhesive between an engaging part and an engaging reception part so as to contact 50% or more of the face area of the face of the engaging part and 50% or more of the face area of the face of the engaging reception part come with the adhesive respectively; the engaging part and the engaging reception part being engaged with each other, and the dental CAD/CAM block and the block holder being joined by the adhesive held in the adhesive holding space.

The processing by a machine includes cutting, polishing, and other processing methods suitable for processing dental CAD/CAM blocks.

It may be preferable that the engaging part includes one or a plurality of engaging protrusions protruding from the first joint face, and that the engaging reception part includes one or a plurality of engaging depressions depressed from the second joint face to receive the one or a plurality of engaging protrusions respectively.

It may be further preferable that the dental CAD/CAM block is provided in a rectangular parallelepiped shape, and one of bottom faces thereof is a joint face; the engaging part or the engaging reception part is formed, when defining one face arbitrarily from the four rectangular parallelepiped side faces as the front face, the opposite face as a back face, and the faces adjacent to the right and left sides toward the front face as a right side face and a left side face respectively, that one end face of the engaging part or the engaging reception part is on the same plane as the front face and extends toward the back face direction; the engaging part or the engaging reception part is shaped, in a coordinate system in which a shared vertex of the other bottom face of the rectangular parallelepiped shape, the front face and the right side face is defined as an origin, x, y and z axes arranged along the first side shared by the other bottom face and the right side face, the second side shared by the other bottom face and the front face, and the third side shared by the front face and the right side face respectively and coordinates (x, y, z) of the end opposite the origin on the first, second and third sides are (100,0,0), (0, 100,0), and (0, 0, 100) respectively, as satisfy at least one of the following conditions; that (1) when the value of the x coordinate of the side end of the rear face is defined for each engaging part or each engaging reception part of the one or a plurality of engaging protrusions or the one or more of engaging depressions as L, the length of that engaging part or engaging reception part, and the maximum value therein is defined as Lmax, the maximum length of the one or a plurality of engaging protrusions or the one or more of engaging depressions, then:

$$100 \geq Lmax \geq 10;$$

(2) when the x coordinate value of each engaging part or each engaging reception part of the one or a plurality of engaging parts or the one or more engaging reception part is p (where p is 0 or more and L or less rational number), and when the width of each engaging g part or each engaging reception part is Wn defined by the absolute value of the difference between the value of the y coordinate of one end part of that engaging part or engaging reception part and the value of the y coordinate of the other end part thereof, then the sum of the width Wn of all the engaging parts or the engaging reception parts is 1 or more and 70 or less, and the width Wn of all the engaging parts or the engaging reception parts are:

$$70 \geq Wo \geq 1 \text{ when } P=0, \text{ and}$$

$Wp\text{-}r \geq Wp$ when $p>0$, where r is an arbitrary rational number of more than 0 and equal to or less than p;
(3) when the x coordinate value of each engaging part or each engagement reception part of the one or a plurality of engaging protrusions or the one or a plurality of engaging depression parts is p (where p is 0 or more and L or less rational number), and the y coordinate value is q (where q is an arbitrary y coordinate value in a region where the engaging part or the engaging reception part exists when x=p), then the height of that engaging part or the depth of that engaging reception part Hp,q is, in actual size:

$$10 \text{ [mm]} \geq Ho,q > 0.1 \text{ [mm] when } p=0, \text{ and}$$

$Hp\text{-}r,q \geq Hp,q$ when $p>0$, where r is an arbitrary rational number of more than 0 and less than p.

The rectangular parallelepiped shape includes not only a strict rectangular parallelepiped in a mathematical sense, but also a rectangular parallelepiped shape (substantially rectangular parallelepiped) in which some dimensional error exists.

It may be further preferable that the block holder includes: a plate-shaped base part on which one face is set as the first joint face or the second joint face and the other face is a holding side face; and an holding prop is erected in the center of the holding side face of the base part; a joint flange is provided around the holding prop by a part of the base part extending in a sword guard shape from the holding prop; and a positioning recess is provided in an appropriate depth from the holding-side face of the joint flange along the axial direction of the holding prop, and from the peripheral edge portion of the joint flange toward the holding prop, in the circumferential direction, for engaging with a positioning tool of a cutting machine cutting the dental CAD/CAM block; wherein there is no portion penetrating the base part from the holding side face to the joint face.

The center of the holding side face on which the holding support prop erected includes the vicinity of the center.

It may be further preferable that the dental CAD/CAM block is a laminated body composed of a plurality of layers, and each layer is a hybrid resin layer having different property from others.

Here, the properties of each layer include color tone, transparency, refractive index, strength, hardness, elastic modulus, wear resistance, fluorescence, and polishability of the constituent matrix polymer and/or filler. Then, the properties of each layer are selected from these groups, and it is preferable that at least one property is different from each other in each layer.

Advantageous Effects of Invention

According to the joining structure for processing according to the present invention, there is no misalignment between the dental CAD/CAM block and the block holder when the dental CAD/CAM block is applied to the cutting machine, and the dental CAD/CAM block is cut and processed with high accuracy.

BRIEF DESCRIPTION OF DRAWINGS

FIGS. 1A and 1B show a joining structure for processing according to a first embodiment of the present invention, FIG. 1A is a perspective view showing a state before joining, and FIG. 1B is a perspective view showing a joined state;

FIGS. 2A and 2B show the block holder of the first embodiment shown in FIGS. 1A and 1B, where FIG. 2A is a perspective view seen from above, and FIG. 2B is a perspective view seen from below;

FIGS. 3A and 3B show a joining structure for processing according to a second embodiment of the present invention, where FIG. 3A is a perspective view showing a state before joining, and FIG. 3B is a perspective view showing a joined state;

FIGS. 4A and 4B show block holders of the second embodiment shown in FIGS. 3A and 3B, where FIG. 4A is a perspective view seen from above, and FIG. 4B is a perspective view seen from below;

FIGS. 5A and 5B show outlines of molding dies for molding the dental CAD/CAM block shown in FIGS. 1A, 1B, 3A and 3B respectively, wherein FIG. 5A is for the dental CAD according to the first embodiment shown in FIGS. 1A and 1B, and FIG. 5B is for the dental CAD/CAM block molding according to the second embodiment shown in FIGS. 3A and 3B, each is also shown a dental CAD/CAM block;

FIGS. 8A and 8B are a diagrams for explaining the position and shape of a modified example of the engaging part formed on the joint face of the dental CAD/CAM block shown in FIGS. 6A to 6K, wherein FIG. 8A is a perspective view and FIG. 8B is a plan view;

FIGS. 9A and 9B show a joining structure for processing according to a third embodiment of the present invention, wherein FIG. 9A is a perspective view showing a state before joining, and FIG. 9B is a perspective view showing a joined state;

FIGS. 10A and 10B show a joining structure for processing according to a fourth embodiment of the present invention, wherein FIG. 10A is a perspective view showing a state before joining, and FIG. 10B is a perspective view showing a joined state;

FIGS. 13A and 13B show perspective views of a dental CAD/CAM block showing a joining structure for processing according to a fifth embodiment of the present invention, wherein FIG. 13A is a perspective view of the dental CAD/CAM block, and FIG. 13A is a plan view;

FIG. 14 is a plan view of a dental CAD/CAM block showing a modification of the fifth embodiment shown in FIGS. 13A and 13B;

FIGS. 15A and 15B are views for explaining a joining structure for processing according to a comparative example, wherein FIG. 15A is a perspective view showing a state before joining, and FIG. 15B is a perspective view showing a state of joining.

DESCRIPTION OF EMBODIMENTS

Figure 16:
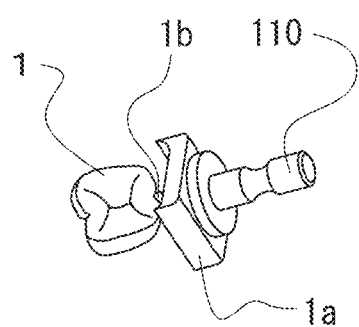
FIG. 16 is a perspective view showing an outline of a dental prosthesis for a back tooth as a processed dental product in which a dental CAD/CAM block is cut.

It will be described hereinafter joining structures for processing according to preferred embodiments of the present invention with reference to the drawings. It will be exemplified a case where a dental CAD/CAM block is provided to a cutting machine and cut to form a dental prosthesis 1 for a back tooth as a dental product as shown in FIG. 16. That is, the dental prosthesis 1 is formed by cutting the dental CAD/CAM block with remaining a joint portion 1a joined to a block holder 110 and a holding rod 1b connected to the joint portion 1a to hold the dental prosthesis 1 as portions other than the dental prosthesis 1. The other portions of the dental CAD/CAM block are cut and removed.

First Embodiment

FIGS. 1A, 1B, 2A and 2B show a joining structure for processing according to a first embodiment of the present invention. FIGS. 1A and 1B are perspective views of a block to be processed 10 as a dental CAD/CAM block and a block holder 13. A state before the joining of the block to be processed 10 and the block holder 13 is shown in FIG. 1A, and the state where the block to be processed 10 is joined to the block holder 13 is shown in FIG. 1B. FIGS. 2A and 2B are perspective views showing the block holder 13, wherein FIG. 1A is a perspective view showing the side opposite to the side shown in FIGS. 1A and 1B from above, and FIG. 2B is a perspective view seen from below.

The block to be processed 10 is formed into a rectangular parallelepiped or a substantially rectangular parallelepiped with a ceramic, a hybrid resin or the like as a raw material. When one face of the block to be processed 10 is used as a front face 10a, the face on the opposite side is defined as a rear face 10b and the right and left side faces toward the front face 10a are defined as a right side face 10c and a left side face 10d. One of the bottom faces is a block-side joint face 10e as a first joint face, and the other is a bottom face 10f. An engaging protrusion 11 is provided on a block-side joint face 10e as an engaging part projecting from the block-side joint face 10e in a rail shape. The engaging protrusion 11 is formed in a rectangular parallelepiped or a substantially rectangular parallelepiped having a function to be described later. One face of the engaging protrusion 11 is a front face 11a disposed in the same plane with the front face 10a of the block to be processed 10. The engaging protrusion 11 is formed so as to extend from an end part where the front face 11a is formed toward the rear face 10b side. Each of the right side face 11b and the left side face 11c of the engaging protrusion 11 is parallel to each of the right side face 10c and the left side face 10d of the block to be processed 10.

The block holder 13 made of a metal material is integrally formed with a disk-shaped base part 14 and a columnar holding prop 15. One face side of the base part 14 is a holder-side joint face 14a as a second joint face, and the other face side is a holding side face 14b A holding prop 15 is erected at or near the center of the holding side face 14b. A part of the base part 14 is larger in diameter than the outer side of the holding prop 15, and the expanded part is formed as a flange part 16. The holder-side joint face 14a of the base part 14 is provided with a recess toward the holding side face 14b as an engagement receiving part or engaging depression 17 for functioning as a guide groove to be engaged with the engaging protrusion 11 provided on the block-side joint face 10e of the block to be processed 10.

The holding side face 14b is provided with a positioning recess 18 having a predetermined depth along the axial direction of the holding prop 15. The positioning recess 18 is provided so as to have a prescribed length from the peripheral edge part of the joint flange part 16, but the position on the center side in the radial direction does not reach the holding prop 15. The positioning recess 18 has a constant width with a radial direction as a center line.

As shown in FIGS. 2A and 2B, the positioning recess 18 does not penetrate the joint flange 16. Note that FIGS. 1A, 1B, 2A and 2B show a shape in which the engaging depression 17 and the positioning recess 18 are formed at positions shifted by approximately 180 degrees each other, but the positional relationship thereof is not limited to this, and set in relation to a block fixing tool of the cutting machine.

The holding prop 15 of the block holder 13 is formed at the center thereof with a fixing chuck 15a recessed in a curved state from the outer peripheral face of the holding prop 15. The holding prop 15 is fixed by engaging a set screw, a fixing protrusion, or the like provided in a chuck device of the cutting machine with the fixing chuck part 15a. As shown in FIGS. 2A and 2B, the holding prop 15 is cut out partially at the tip end thereof to provide a cutout portion 15b.

As shown in FIG. 1B, the block holder 13 is positioned at a predetermined position with respect to the block to be processed 10 when the engaging protrusion 11 is engaged with the engaging depression 17. The engaging protrusion 11 and the engaging depression 17 are provided with an appropriate gap between these when engaged with each other. At the time of joining these, an adhesive is applied to either or both of the engaging protrusion 11 and the engaging depression 17, and an adhesive holding space capable of holding the adhesive corresponds to the gap between the engaging protrusion 11 and the engaging depression 17.

The adhesive holding space is configured to hold the adhesive between an engaging part and an engaging reception part when these are engaged and 50% or more of the surface area (hereinafter called as "the facing surface area of the engaging part at engagement") of the surface of the engaging part (hereinafter called as "the facing surface of the engaging part at engagement") and 50% or more of the surface area (hereinafter called as "the facing surface area of the engaging reception part at engagement") of the surface of the engaging reception part (hereinafter called as "the facing surface of the engaging part at engagement") come into contact with the adhesive respectively. In this case, the region where the engaging part and the engaging reception part face each other at engagement, and the surface area of the engaging part and the surface area of the engaging reception part at engagement (that is, the facing surface area of the engaging part at engagement and the facing surface area of the engaging reception part at engagement) mean the surface area of the portion where the engaging part and the engaging reception part are opposed to each other when the engagement is completed. Both of the areas are the same. For example, in the case where the engaging part is the engaging protrusion 11 and the engaging reception part is the engaging depression 17, the facing surface area of the engaging part at engagement or the facing surface area of the engaging reception part at engagement is equal to the total area of the surface area of the part where the upper face of the engaging protrusion 11 and the bottom face of the engaging depression 17 face each other and overlap with each other, and the surface area of the part where the entire side face of the engaging protrusion 11 or the entire side face of the engaging depression 17.

The adhesive holding space is formed by a gap provided between the engaging portion and the engaging reception, and the width of the gap is set appropriately as 50% or more, preferably 70% or more, and most preferably 100% of the facing surface area of the engaging part at engagement or the facing surface area of the engaging reception part at engagement so as to be in contact with the adhesive and retain the adhesive. In order to form a gap that serves as such an adhesive holding space, the width and/or height of the upper face of the engaging protrusion 11 is set to be, for example, smaller than the width and/or depth of the bottom face of the engaging depression 17 respectively. It may be set slightly smaller, for example, in the range of 25 μm or more and 300 μm or less, preferably in the range of 50 μm or more and 200 μm or less.

Second Embodiment

It will be described a second embodiment of the joining structure for processing according to the present invention with reference to FIGS. 3A, 3B, 4A and 4B. FIGS. 3A and 3B are a perspective view of a block to be processed 20 as a dental CAD/CAM block and a block holder 23, FIG. 3A is a perspective view showing a state in which the block to be processed 20 and the block holder 23 are joined together. FIGS. 4A and 4B are a perspective view showing the block holder 23, and FIG. 4A is a perspective view of the side opposite to the side shown in FIGS. 3A and 3B from above, and FIG. 4B is a perspective view viewed from below.

The block to be processed 20 is formed into a rectangular parallelepiped or a substantially rectangular parallelepiped by a material such as a ceramic or a hybrid resin, and each face has a front face 20a, a rear face 20b, a right side face 20c, a left side face 20d, a block-side joint face 20e as a second joint face, and a bottom face 20f. The block-side joint face 20e is provided with an engaging depression 21 as an engaging reception part by a recess recessed from the block-side joint face 20e to an appropriate depth. The engaging depression 21 is formed by opening one end to the front face 20a and extending toward the rear face 20b side. The engaging depression 21 is formed in a rectangular parallelepiped or a substantially rectangular parallelepiped. The right side face 21a and the left side face 21b inside the engaging depression 21 forming the rectangular parallelepiped or the substantially rectangular parallelepiped are parallel to the right side face 20c and the left side face 20d of the block to be processed 20.

The block holder 23 made of a metal material is integrally formed with a disk-shaped base part 24 and a columnar holding prop 25. One face side of the base part 24 is a holder side joint face 24a as a first joint face, and the other face side is a holding side face 24b.

A holding prop 25 is erected at or near the center of the holding side face 24b. A part of the base part 24 is larger in diameter than the outer side of the holding prop 25, and the expanded part is formed as a flange part 26. The holder-side joint face 24a of the base part 24 is provided with an engaging protrusion 27 as an engaging part to be engaged with an engaging depression 21 provided on the block-side joint face 20e of the block to be processed 20.

The holding side face 24b is provided with a positioning recess 28 having a predetermined depth along the axial direction of the holding prop 15. The positioning recess 28 is provided so as to have a prescribed length from the peripheral edge part of the joint flange part 26, but the position on the center side in the radial direction does not reach the holding prop 25. The positioning recess 28 has a constant width with a radial direction as a center line.

As shown in FIGS. 4A and 4B, the positioning recess 28 does not penetrate the joint flange 26. Note that FIGS. 3A, 3B, 4A and 4B show a shape in which the engaging protrusion 27 and the positioning recess 28 are formed at positions shifted by approximately 180 degrees each other, but the positional relationship thereof is not limited to this, and set in relation to a chuck devise of the cutting machine.

The holding prop 25 of the block holder 23 is formed at the center thereof with a fixing chuck 25a recessed in a curved state from the outer peripheral face of the holding prop 25. The holding prop 25 is fixed by engaging a set screw, a fixing protrusion, or the like provided in the chuck device of the cutting machine with the fixing chuck part 25a. As shown in FIGS. 4A and 4B, the holding prop 25 is cut out partially at the tip end thereof to provide a cutout portion 25b.

As shown in FIG. 3B, the block holder 23 is positioned at a predetermined position with respect to the block to be processed 20 when the engaging protrusion 27 is engaged with the engaging depression 21 so as to be received. The engaging depression 21 and the engaging protrusion 27 are provided with an appropriate gap between these when engaged with each other. At the time of joining these, an adhesive is applied to either or both of the engaging depression 21 and the engaging protrusion 27, and an adhesive holding space capable of holding the adhesive corresponds to the gap between the engaging depression 21 and the engaging protrusion 27.

Operation of First Embodiment and Second Embodiment

The block to be processed 10 and the block holder 13 according to the first embodiment, and the block to be processed 20 and the block holder 23 according to the second embodiment are both joined by an adhesive. As such an adhesive, it may be used ones suitable for joining the blocks to be processed 10, 20 made of a material such as ceramic or hybrid resin, and the block holders 13, 23 made of a metal such as aluminum or duralumin.

In order to join the blocks to be processed 10 and 20 to the block holders 13 and 23, the block holders 13 and 23 are gripped by using a robot arm or the like. The block holders 13 and 23 are then lowered toward the blocks to be processed 10 and 20 from above the block-side joint faces 10e and 20e of the blocks to be processes 10 and 20.

In the first embodiment, an adhesive is applied to either or both of the engaging protrusion 11 of the block to be processed 10 and the engaging depression 17 of the block holder 13. At this time, the adhesive is filled in the adhesive holding space (not shown) and is appropriately held.

After the adhesive is applied, the holder-side joint face 14a of the block holder 13 is put on the block-side joint face 10e of the block to be processed 10 and the engaging protrusion 11 is received in the engaging depression 17. At this time, the block holder 13 is positioned at a predetermined position with respect to the block to be processed 10 by the engaging protrusion 11 and the engaging depression 17. Since the applied adhesive is maintained in a state of being held in the adhesive holding space, it does not exude from the engaging portion between the engaging protrusion 11 and the engaging depression 17. Then, the hardening of the adhesive ensures that the block to be processed 10 and the block holder 13 are joined to each other, and the block to be processed 10 and the block holder 13 are integrated.

In the second embodiment, an adhesive is applied to either or both of the engaging depression 21 of the block to be processed 20 and the engaging protrusion 27 of the block holder 23 to be filled in the adhesive holding space (not shown) to properly hold the adhesive.

After the adhesive is applied, the holder-side joint face 24a of the block holder 23 is put on the block-side joint face 20e of the block to be processed 20 and the engaging protrusion 27 is received in the engaging depression 21. At this time, the block holder 23 is positioned at a predetermined position with respect to the block to be processed 20 by the engaging depression 21 and the engaging protrusion 27. Since the applied adhesive is maintained in a state of being held in the adhesive holding space, it does not exude from the engaging portion between the engaging depression 21 and the engaging protrusion 27. Then, the hardening of the adhesive ensures that the block to be processed 20 and the block holder 23 are joined to each other, and the block to be processed 20 and the block holder 23 are integrated.

When a joint body between the block to be processed 10 or the block holder 13 according to the first embodiment and the joint body of the block to be processed 20 and the block holder 23 according to the second embodiment is supplied to a block fixing tool (not shown), a positioning member (not shown) which may a projection or the like provided with the block fixing tool is inserted into the positioning recess 18 or 28 from the extending side of the holding prop 15 or 25. Thus, the block to be processed 10 or 20 joined to the block holder 13 or 23 is positioned with respect to the block fixing tool provided in the cutting machine.

Various types of cutting machines are available for the blocks to be processed 10, 20 and each has a unique positioning mechanism. Therefore, there are provided joined bodies to which the block holder 13 or 23 is joined, dedicated for respective cutting machines and having shapes corresponding to respective positioning mechanisms. On the other hand, the block holder 13 or 23 may be configured as a so-called universal type in which positioning recess 18a or 28a and the like are provided in several types so as to correspond to the positioning mechanism of a typical several kinds of cutting processing devices.

By the way, as described above, there is a risk of misalignment of the block holder 13 or 23 with respect to the block to be processed 10 or 20, which may occur when the joint body between the block to be processed 10 or 20 and the block holder 13 or 23 is moved before the adhesive is cured. In order to cope with this risk, it was considered and attempted, for example, to provide a rail-like projection on the block-side joint face 10e or 20e of the block to be processed 10 or 20, provide a recessed groove to be engaged with the projection on the holder-side joint face 14a or 24a of the block holder 13 or 23, insert, slide and move the projection into the recessed groove to ensure the engagement relationship between these so that the block holder 13 or 23 could be fixed to the block to be processed 10 or 20 at a predetermined position. However, on a result of our test, it has been found that the adhesive used is scraped or extruded from the block-side joint face 10e, 20e or the holder-side joint face 14a, 24a at sliding movement, and there is a risk that sufficient adhesive strength cannot be obtained due to insufficient adhesive. As another problem, it has been found that a part of the adhesive protrudes from the engagement part to impair the aesthetic appearance or the adhesion of dirt.

As a result of further examination, we have found that the poor adhesion can be eliminated by a structure in which a gap is provided between the projection and the recessed groove to hold the adhesive in the gap can eliminate. We also successfully found an engaging structure in which such a gap can be formed and which can be easily taken out from a mold when the block is molded by using the mold.

In addition to the effect of providing the adhesive holding space, the problem in the case that the adhesive holding space the is not provided is not limited to the combination of the rail-shaped projection and the recessed groove. For example, a gap is not substantially provided between the engaging part and the engaging reception part, and similar problems can be occurred even when the engaging protrusion 11 and the engaging depression 17 are fitted tightly, for example. That is, in this case, in the process of engaging both of these, the gap between the upper face of the engaging protrusion 11 and the bottom face of the engaging depression 17 are gradually narrowed toward zero and the side faces of the engaging protrusion 11 and the engaging depression 17 where are respectively released and exposed are gradually narrowed, so that the adhesive applied to these faces The adhesive applied to these faces has no choice but to lose its place and try to stay in the engaging depression, or to try to flow out onto the flat joint face where the engaging protrusion 11 and the engaging depression 17 are not formed on the joint face of the block 10 and block holder 13. As a result, the complete engagement may be prevented or the thickness of the adhesive may become nonuniform by the adhesive flowing out on the flat face so that the block 10 and the block holder 13 may be relatively tilted and joined as these are. If the block 10 and the block holder 13 are strongly pressed in order to prevent such tilting, a large amount of adhesive spills out from the joint face as in the above-mentioned case, resulting in deterioration of aesthetic appearance, dust, etc. If the amount of adhesive that overflows is too large and the amount of adhesive remaining on the joint face is small, there is a risk that sufficient adhesive strength cannot be obtained. Then, such a problem is considered to become more remarkable when the application location and application amount of the adhesive cannot be highly controlled.

On the other hand, in the engagement structure of the present invention, since the adhesive holding space functions as a buffer, the occurrence of such a problem can be effectively prevented even when the application site and the application dose of the adhesive cannot be highly controlled. For example, in a method of adhering the engaging part and the engaging reception part by applying an adhesive in the first embodiment or the second embodiment as described above, the adhesive can be naturally filled in the adhesive holding space on a process for supplying the adhesive having an amount approximately equal to the volume of the adhesive holding space on the upper face of the engaging protrusion, which is the facing face of the engaging part at engagement, in the first embodiment or on the bottom face of the engaging depression, which is the facing face of the engaging reception part at engagement, in the second embodiment and then putting on the engaging part and the engaging reception part each other. Therefore, the adhesive can be surely adhered while preventing the overflow of the adhesive by the very simple method of simply controlling only the volume of the adhesive without especially considering the application place and the coating amount (thickness) of the adhesive.

Hereinbefore described respective structures of the engaging protrusion 11 and the engaging depression 17 being combined in the first embodiment, and the engaging depression 21 and the engaging projection 27 being combined in the second embodiment. Each of these is used in single, but the engaging protrusion 11 and the engaging depression 17, and the engaging depression 21 and the engaging protrusion 27 can be provided without being limited to the singular. The engaging protrusion 11 and the engaging depression 17, and the engaging depression 21 and the engaging protrusion 27 are described as a rectangular parallelepiped or a substantially rectangular parallelepiped shape, but may be other shapes. The engaging protrusion 11 and the engaging depression 21 are formed into a rectangular parallelepiped or a substantially rectangular parallelepiped or other shape, and each of the brocks to be processed 10, 20 can be formed into an arbitrary shape when cutting and molding from a block such as an ingot having a large shape.

However, the brocks to be processed 10, 20 used for forming the dental products are expensive materials such as ceramic and hybrid resin, and the parts corresponding to shavings generated when cutting out are wasted. It makes the brocks to be processed 10, 20 expensive. Therefore, the brocks to be processed 10, 20 formed by mold processing are advantageous in terms of price. In the mold processing, the brock to be processed 10 or 20 is formed from one or more of the above mentioned materials by filling the material into a molding die and curing it without cutting it. If the structure of the molding die is complicated, mold processing becomes complicated. It is preferable to take out the brock to be processed 10 or 20 from the molding die by sliding the brock to be processed 10 or 20 formed in one direction with respect to the molding die. As described below, the brocks to be processed 10, 20 are formed by using the molding dies shown in FIGS. 5A and 5B.

(Molding Die and Molding of Block to be Processed)

Figure 5A:
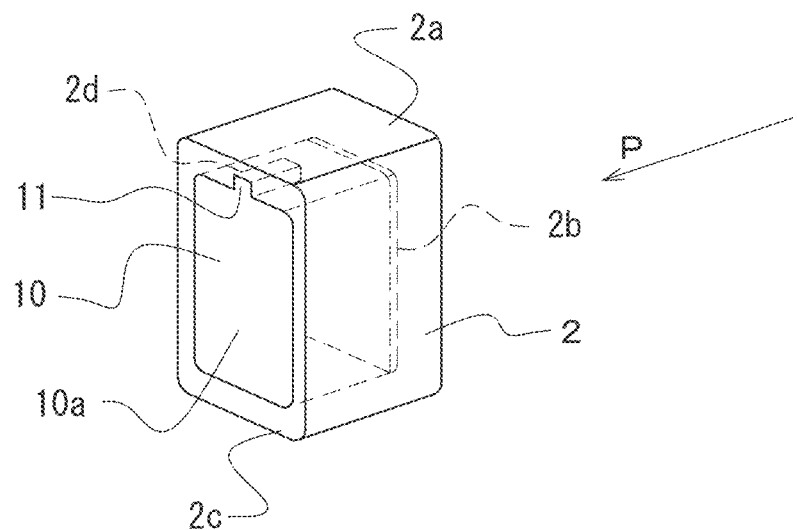
Figure 5B:
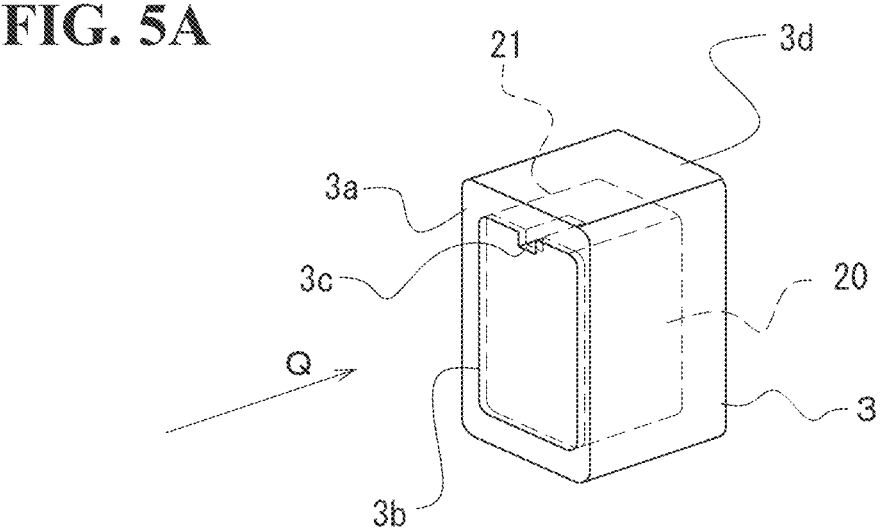

FIGS. 5A and 5B shows schematic perspective views of molding dies suitable for molding brocks to be processed 10, 20. The molding die 2 shown in FIG. 5A is for the brock to be processed 10 according to the first embodiment, and the molding die 3 shown in FIG. 5B is for the brock to be processed 20 according to the second embodiment.

The molding die 2 is formed as that the outer shape thereof is a cylindrical shape having a rectangular parallelepiped shape or a substantially rectangular parallelepiped shape, and houses, in a rear side end 2a on the rear side of the cylinder in a direction indicated by an arrow mark P in FIGS. 5A and 5B, a pusher plate 2b movably along the axial direction inside the cylinder. The front face 10a of the brock to be processed 10 molded by the molding die 2 is formed at a front end 2c on the side opposite to the end where the pusher plate 2b is arranged. That is, the side of the front end 2c becomes the front face 10a of the brock to be processed 10, and the engaging protrusion 11 is arranged on the side of the front side end 2c. The molding die 2 is provided with a molding depression 2d to which the engaging protrusion 11 is molded. FIG. 5A shows a state in which a molding material is filled and a brock to be processed 10 is formed inside the molding die 2.

When a molding material such as a hybrid resin is filled in the molding die 2 while the pusher plate 2b is positioned at the rear side end 2a, the brock to be processed 10 is molded. After the molding material is cured, the pusher plate 2b is slid in the direction of the arrow P in FIG. 5A. Then, the molding material filled in the molding die 2 is pushed out from the front end 2c, and the molded brock to be processed 10 is taken out from the molding die 2.

The molding die 3 is formed as that the outer shape thereof is a cylindrical shape having a rectangular parallelepiped or a substantially rectangular parallelepiped tubular shape, and houses, at the rear end 3a on the rear side in the direction indicated by the arrow mark Q on FIG. 5B, a pusher plate 3b movably along the axial direction inside the cylinder. The front face 20a of the brock to be processed 20 molded by the molding die 3 is molded on the rear side end 3a of the molding die 3. The rear side end 3a of the molding die 3 is formed with a molding protrusion 3c to which the engaging depression 21 of the brock to be processed 20 is molded. The front side in the direction of the arrow mark Q of the molding die 3 is a front side end 3d.

When the molding die 3 is filled with a molding material such as a hybrid resin while the pusher plate 3b is positioned at the rear end 3*a*, a brock to be processed 20 is molded. After the molding material is cured, the pusher plate 3*b* is slid in the direction of the arrow Q in FIG. 5B. As a result, the molding material filled in the molding die 3 is pushed out from the front end 3*d*, and the molded brock to be processed 20 is taken out from the molding die 3.

As described above, when the brocks to be processed 10, 20 are molded by the molding dies 2, 3, it is preferable that the molding material filled in the molding dies 2, 3 is extruded from one end side to the other end side of the molding dies 2, 3 to be easily molded. In this way, the engaging part or the engaging reception part provided on the brock to be processed 10 or 20 must be in a position or a shape allowing the pushing operation to be pushed out from one end side to the other end side. The engaging part or the engaging reception part is required to be provided at a plurality of places so as to surely join the brock to be processed 10, 20 and the block holder 13, 23, and in this case, it is necessary to easily perform the pushing operation of the brock to be processed 10, 20 from the mold 2, 3.

When forming an engaging structure of an engaging part and an engaging reception part on a joint face of a block by cutting or the like, loss of a block material such as expensive ceramics or hybrid resin is not avoided, whereas the loss of such a material is reduced when the block is formed by molding using the molding die 2 or 3 as described above.

Modified Example of First Embodiment

In FIGS. 6A to 6K, brocks to be processed provided with engaging protrusions in various shapes are exemplified, wherein the number and shapes of the engaging protrusions 11 of the brocks to be processed 10 are different from each other. It will be described as that, for each of the brocks to be processed of various shapes shown in FIGS. 6A to 6K, the main body excluding the engaging protrusion 11 of the brock to be processed 10 is shown by a block body 4, and various engaging protrusions 5 are formed on the block body 4.

Figure 6A:
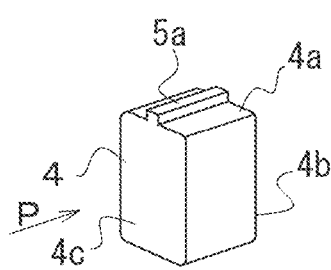
FIGS. 6A to 6K perspective views of dental CAD/CAM blocks providing with various modifications of the engaging part of the first embodiment shown in FIGS. 1A and 1B.

FIG. 6A shows a block body 4 provided with a single engaging protrusion 5*a* formed in a rectangular parallelepiped or a substantially rectangular parallelepiped. The engaging protrusion 5*a* is formed from a front face 4*b* to a rear face 4*c* on a block-side joint face 4*a*.

Figure 6B:
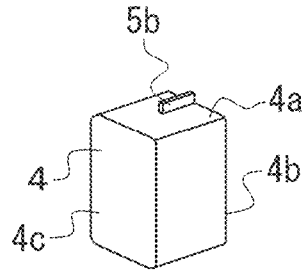

FIG. 6B shows a block body 4 provided with a single engaging protrusion 5*b* formed in a rectangular parallelepiped or a substantially rectangular parallelepiped. The engaging protrusion 5*b* is formed in a width smaller than that of the engaging protrusion 11 shown in the first embodiment, and is formed from the front side 4*b* to the vicinity of the center on the block-side joint face 4*a*.

Figure 6C:
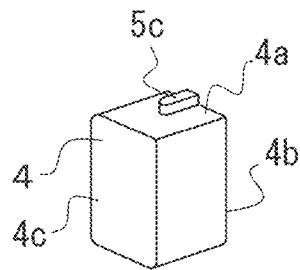

FIG. 6C shows a block body 4 provided with a single engaging protrusion 5*c* formed in a rectangular parallelepiped or a substantially rectangular parallelepiped. The engaging protrusion 5*c* is formed in the block-side joint face 4*a* from the front side 4*b* of the block body 4 to the vicinity of the center of the block-side joint face 4*a*, and the tip part on the center side is formed in a shape of a part of a cylinder.

Figure 6D:
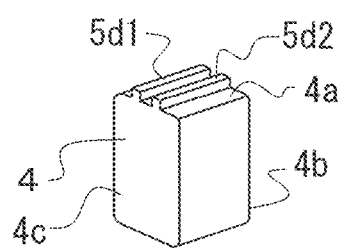

FIG. 6D shows a block body 4 provided with two engaging protrusions 5*d*1, 5*d*2 formed in a rectangular parallelepiped or a substantially rectangular parallelepiped. The engaging protrusions 5*d*1, 5*d*2 are formed from a front face 4*b* to the rear face 4*c* on the block-side joint face 4*a*.

Figure 6E:
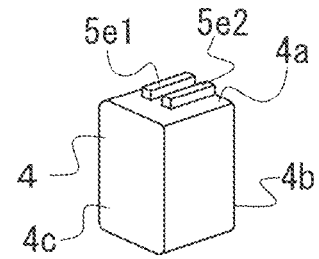

FIG. 6E shows a block body 4 provided with two engaging protrusions 5*e*1, 5*e*2 formed in a rectangular parallelepiped or a substantially rectangular parallelepiped shape in parallel with the block body 4. The engaging protrusions 5*e*1, 5*e*2 are formed in the block-side joint face 4*a* from the front face 4*b* of the block body 4 to the vicinity of the center of the block-side joint face 4*a*.

Figure 6F:
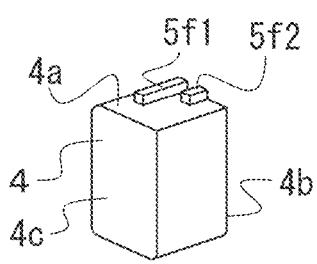

FIG. 6F shows a block body 4 provided with two engaging protrusions 5*f*1 and 5*f*2 formed in a rectangular parallelepiped or a substantially rectangular parallelepiped shape in parallel with the block body 4. The engaging protrusions 5*f*1 and 5*f*2 are formed in the block-side joint face 4*a* from the front face 4*b* of the block body 4 to the vicinity of the center of the block-side joint face 4A. The engaging protrusion 5*f*2 is shorter than the engaging protrusion 5*f*1.

Figure 6G:
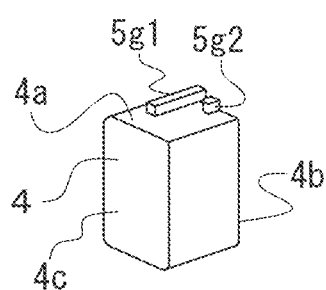

FIG. 6G shows a block body 4 provided with two engaging protrusions 5*g*1 and 5*g*2 formed in a rectangular parallelepiped or a substantially rectangular parallelepiped shape in parallel with the block body 4. The engaging protrusions 5*g*1 and 5*g*2 are formed in the block-side joint face 4*a* from the front face 4*b* of the block body 4 to the vicinity of the center of the block-side joint face 4*a*. The engaging protrusion 5*g*2 is made shorter than the engaging protrusion 5*g*1, and the distal end of the engaging protrusion 5*g*2 is formed in a shape of a part of a cylinder.

Figure 6H:
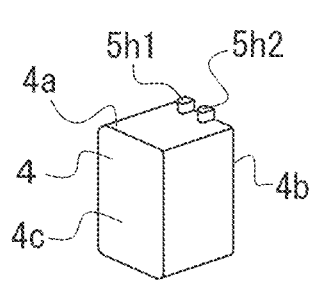

FIG. 6H shows a block body 4 provided with two engaging protrusions 5*h*1, 5*h*2 formed in a rectangular parallelepiped or a substantially rectangular parallelepiped shape in parallel with the block body 4. The engagement protrusions 5*h*1, 5*h*2 are formed so as to extend from the front face 4*b* toward the rear face 4*c* side directly from the front face 4*b*. That is, the engaging protrusions 5*h*1, 5*h*2 are shorter than the engaging protrusions 5*e*1 and 5*e*2 shown in FIG. 6E, and the tips of the engagement protrusions 5*h*1 and 5*h*2 are formed in a shape of a part of a cylinder.

Figure 6I:
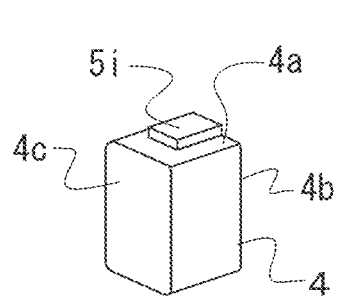

FIG. 6I shows a block body 4 provided with a single engaging protrusion 5*i* formed in a rectangular parallelepiped or a substantially rectangular parallelepiped. The engaging protrusion 5*i* is wider than the engaging protrusion 11 shown in the first embodiment. The engaging protrusion 5*i* is formed in the vicinity of the center from the front side 4*b* on the block-side joint face 4*a*.

Figure 6J:
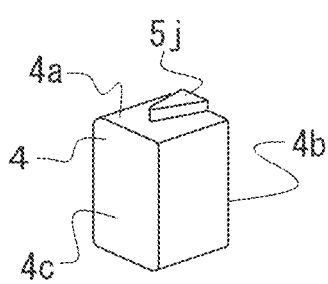

FIG. 6J shows a block body 4 provided with a single engaging protrusion 5*j*. The engaging protrusion 5*j* is formed in an approximately isosceles triangle shape, its bottom side coincides with the front face 4*b*, and the apex is formed in the vicinity of the center of the block-side joint face 4*a*.

Figure 6K:
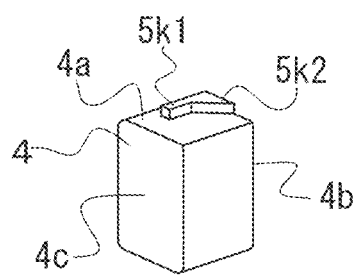

FIG. 6K shows a block body 4 provided with a single engaging protrusion 5*k*. The engaging protrusion 5*k* is formed in a shape in which a rectangular parallelepiped or a substantially rectangular parallelepiped part 5*k*1 and a triangular part 5*k*2 are combined. The part 5*k*1 is formed from the front face 4*b* to the vicinity of the center of the block-side joint face 4*a*. The part 5*k*2 is formed by positioning the base on the front face 4*b* of the block-side joint face 4*a* and positioning the vertex in the vicinity of the center of the part 5*k*1.

Any block body 4 provided with the engaging protrusion 5 shown in FIGS. 6A to 6K can be taken out from the mold by pushing out the direction indicated by the arrow mark P in FIG. 6A, that is, from the rear face 4*c* side to the front face 4*b* side.

In FIGS. 6A to 6K, shapes in which the engaging protrusions 5 as engagement parts are formed are shown. Therefore, in order to take out the block body 4 from the molding die, the block body 4 is pushed out from the rear face 4*c* side to the front face 4*b* side. On the contrary, for the shape where the block body is provided with the engaging depression 21 according to the second embodiment in place of the engaging protrusion 5, the block body 4 is pushed out from the front face 4b side to the rear face 4c side, that is, in a direction opposite to the arrow mark P direction.
(Regarding Conditions of Position and Shape of Engaging Part and Engaging Reception Part)

Figure 7:
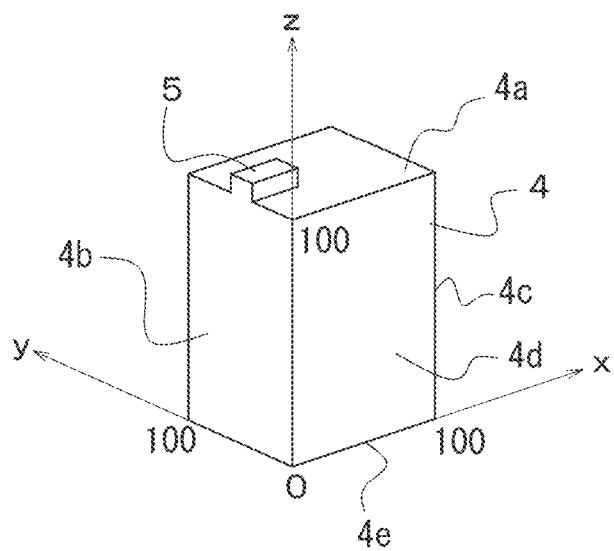
FIG. 7 is a perspective view illustrating the position and shape of the engaging part formed on the joint face of the dental CAD/CAM block.

One or more engaging parts or engaging reception parts are described with reference to FIG. 7 with respect to a state in which the brocks to be processed 10, 20 and the block holders 13, 23 are surely joined. FIG. 7 is a diagram for defining a coordinate system for the block body 4 excluding the engaging protrusion 11 and the engaging depression 21 from the brocks to be processed 10, 20, and shows a state in which a rectangular parallelepiped or a substantially rectangular parallelepiped-shaped engaging protrusion 5 is provided.

With respect to the block body 4, as shown in FIG. 7, the direction of the boundary between the front face 4b and the right side face 4d of the block body 4 is defined as a Z axis, the direction of the boundary between the right side face 4d and the bottom face 4e is defined as the X axis, and the direction of the side (second side) of the boundary between the front face 4b and the bottom face 4e is defined as the Y axis, and the X axis, the Y axis, and the Z axis are determined. The coordinates of the side opposite to the side passing through the origin are defined as (100,0,0), (0, 100,0), and (0, 0, 100). The position and shape of the one or more engaging parts or the engaging reception part are made to satisfy the following conditions.

(Condition 1)
(1) When the value of the x coordinate of the side end of the rear face 4c is defined as L for each engaging part or each engaging reception part of one or a plurality of engaging protrusions or one or more of engaging depressions, and the maximum value therein is defined as Lmax, then:

$$100 \geq Lmax \geq 10 \quad \text{(Formula 1)}$$

more preferably, $$95 \geq Lmax \geq 15$$

more preferably, $$90 \geq Lmax \geq 20$$

(Condition 2)
(2) When the x coordinate value of each engaging g part or each engaging reception part of the one or a plurality of engaging protrusions or the one or more engaging depressions is p (where p is 0 or more and L or less rational number), and when the width of each engaging part or each engaging reception part is defined as Wn, then the sum of the width Wn of all the engaging parts or the engaging reception parts is 1 or more and 70 or less, and the width Wn of all the engaging parts or the engaging reception parts are:

$$70 \geq Wo \geq 1 \text{ when } P=0, \text{ and}$$

Wp-r≥Wp when p>0 (where r is an arbitrary rational number of more than 0 and equal to or less than p) (Formula 2)

In Formula 2, Wo is more preferably 60≥WO≥3, more preferably 50≥Wo≥5.
(Condition 3)
(3) When the x coordinate value of each engaging part or each engagement reception part of one or a plurality of engaging protrusions or one or a plurality of engaging depression parts is p (where p is 0 or more and L or less rational number), and the y coordinate value is q (where q is an arbitrary y coordinate value in a region where the engaging part or the engaging reception part exists when x=p), then the depth of all the engaging parts or the depth of all the engaging reception parts Hp,q is, in actual size:

$$10 \text{ [mm]} \geq Ho,q \geq 0.1 \text{ [mm] when } p=0,$$

Hp-r,q≥Hp,q (r is an arbitrary rational number of more than 0 and less than p) when p>0 (Formula 3)

In Formula (3), Ho,q are more preferably 7 [mm]≥Hq, q≥0.3 [mm], and more preferably 5 [mm]≥Ho,q≥0.5 [mm].

That is, while Formulae 1 to 3 are satisfied, the adhesive holding space is made 50% or more of the surface area of the engaging part and 50% or more of the surface area of the engaging reception part, in a region where the engaging part and the engaging reception part face each other at the time of engagement, be respectively brought into contact with the adhesive to hold it, thereby the block to be processed 10, 20 and the block holder 13, 23 can be joined or adhered reliably and with high strength. Moreover, by providing the adhesive holding space, almost all of the applied adhesive is used for joining the brock to be processed 10, 20 and the block holder 13, 23 each other.

Figure 8A:
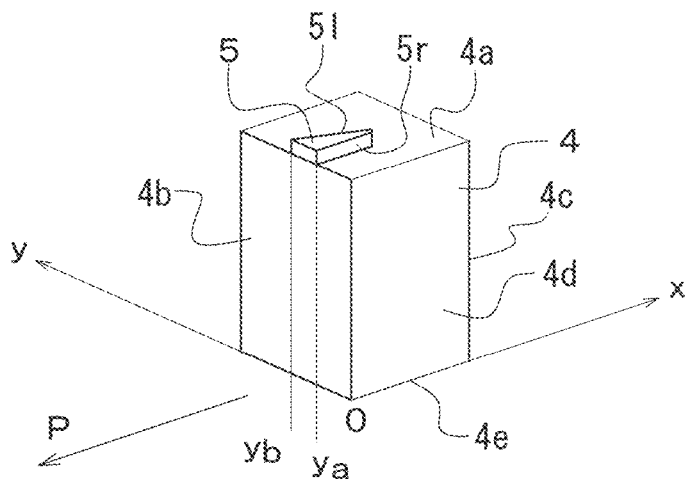
Figure 8B:
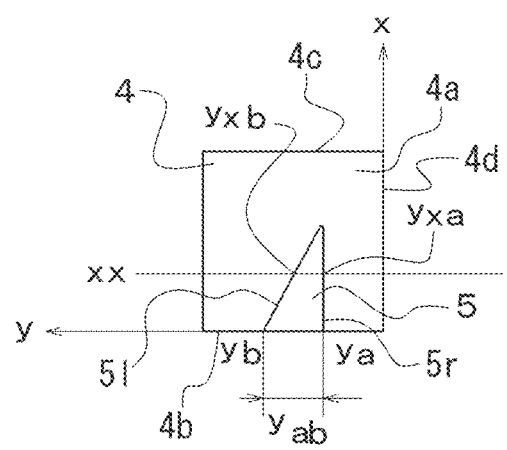

FIGS. 8A and 8B show a condition in which the brock to be processed can be removed from the mold for the shapes of the one or more engaging parts or the engaging reception part. FIG. 8A is a perspective view and (B) is a plan view. FIGS. 8A and 8B are a diagram defining a coordinate system for the block body 4 excluding the engaging protrusion 11 and the engaging depression 21 from the brocks to be processed 10, 20, and being provided with an engaging protrusion 5 having a substantially triangular planar shape.

On the block body 4, as shown in FIGS. 8A and 8B, the direction of the side of the boundary between the right side face 4d and the bottom face 4e of the block body 4 is defined as an x-axis, the direction of the side of the boundary between the front face 4b and the bottom face 4e is defined as a y-axis, and the intersection of the x-axis and the y-axis is defined as the origin zero, and the x-axis and the y-axis are defined as the origin zero. The y coordinate of the intersection of the right side face 5r and the front face 4b of the engaging projection 5 is ya, the y coordinate of the intersection of the left side face 5l and the front face 4b is yb, and the difference (ya−ya) in the y axis direction between the ya and yb is yab.

In the x-axis direction xx coordinate shown in FIGS. 8A and 8B, the coordinates of the intersection with the right side face 5r are yxa, and the coordinate of the intersection of yxa and yxb is yxb, and the difference (yxb−yxa) in the y-axis direction between these yxa and yxb is represented by yxab.

Assuming that the y coordinate of the point on the engaging protrusion 5 is yi, the shape of the engaging protrusion 5 is set to satisfy:

$$ya \leq yi \leq yb \quad \text{(Formula 4)}$$

and when the relationship of x coordinates is xi<xj, and when yxab in xi is yxi and yxab in xj is yaj, then:

$$Y \, xj \leq yxi \quad \text{(Formula 5)}$$

Thus, when the block body 4 provided with the engaging protrusion 5 is molded, it can be taken out form the molding die by sliding it in the direction indicated by the arrow mark P in the FIG. 8A.

In addition, even when an engaging depression as an engaging reception part having a shape other than a rectangular parallelepiped or a substantially rectangular parallelepiped is formed in the brock to be processed instead of the engaging part, it is necessary to satisfy the condition of Formula 4 and Formula 5. In this case, the brock to be processed in which the engaging depression is formed is slid in the direction of the arrow mark P, so that it can be taken out from the molding die.

That is, by adopting a combination of an engagement protrusion and an engaging depression having a shape satisfying Formula 4 and Formula 5 as a combination of the engaging part and the engaging reception part, a dental CAD/CAM block can be manufactured by a molding method capable of taking out the product from the molding die by sliding it in one direction with respect to the molding die. It can reduce the manufacturing cost of the CAD/CAM block and improve the manufacturing efficiency.

Third Embodiment

Figure 9A:
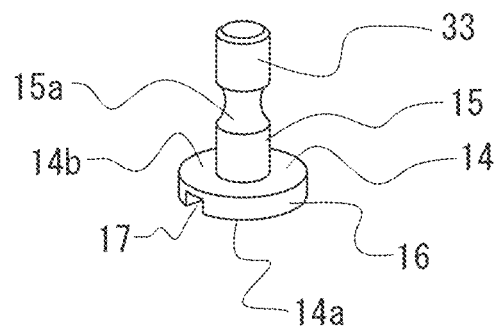
Figure 9A:
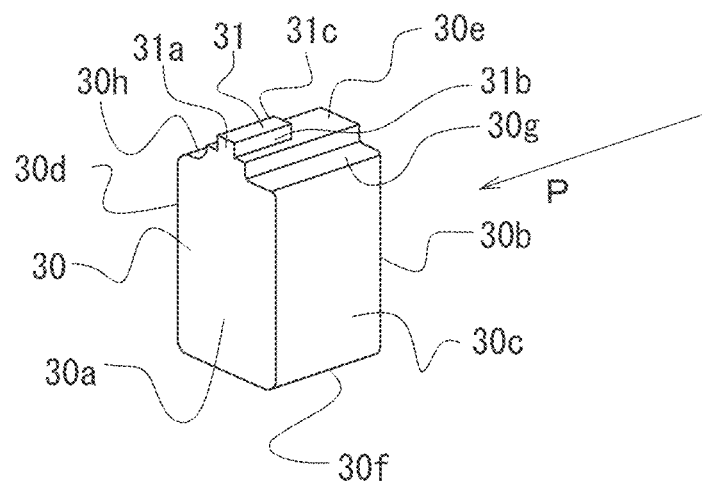
Figure 9B:
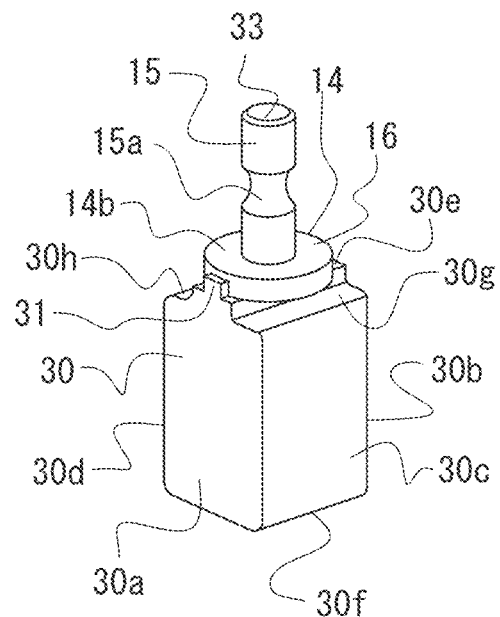

It will be described a joining structure for processing according to a third embodiment of the present invention with reference to FIGS. 9A and 9B. FIGS. 9A and 9B show perspective views or a brock to be processed 30 and a block holder 33, wherein FIG. 9A shows a perspective view of a state before joining the brock to be processed 30 and the block holder 33, and FIG. 9B) shows a perspective view of a state in which the brock to be processed 30 and the block holder 33 are joined. Similarly to the block holder 13 according to the first embodiment, the block holder 33 has the same shape as the shape shown in FIGS. 2A and 2B.

The brock to be processed (30) is formed in such a shape that the upper edge of the right side face 10c and the left side face 10d of the block-side joint face 10e of the brock to be processed 10 shown in FIGS. 1A and 1B is cut out from the front face 10a toward the bottom face 10f over the rear face 10b.

That is, as shown in FIGS. 9A and 9B, on the brock to be processed 30 which is made of ceramic, hybrid resin or the like as a raw material and formed into a rectangular parallelepiped or a substantially rectangular parallelepiped, and having a front face 30a corresponding to the front face 10a, a right side face 30c corresponding to the right side face 10c, a left side face 30d corresponding to the left side face 10d, and a bottom face 30f corresponding to the bottom face 10f, a block-side joint face 30e is formed in the center of the right side face 30c and the left side face 30d on the upper face on the opposite side of the bottom face 30f. A right cutout portion 30g in which a part of the upper face is cutout portioned is formed at an edge part of the upper face and the right side face 30c, and a left cutout portion part 30h in which a part of the upper face is cutout portioned is formed on an edge part of the upper face and the left side face 30d. Depending on the shape of the dental prosthesis to be molded, a portion corresponding to the right cutout portion 30g and the left cutout portion 30h is not a part of the dental prosthesis, and it is clear that the cut is always cut, and in such a case, the right cutout portion 30g and the left cutout portion 30h are formed for not only the time of cutting work being shortened but also the material of the block being saved.

The block-side joint face 30e is provided with an engaging protrusion 31 as an engaging part projecting from the block-side joint face 30e. The engaging protrusion 31 is formed in a rectangular parallelepiped or a substantially rectangular parallelepiped so that the engaging protrusion 31 does not interfere with taking out from the molding die at molding of the block to be processed 30 and can be securely joined with the block holder 33. One face of the engaging protrusion 31 is a front face 31a where is arranged in the same plane as the front face 30a with one face as a front face 31a. The engaging protrusion 31 is formed so as to extend from an end part where the front face 31a is formed toward a rear face 30b side. The right side face 31b and the left side face 31c of the engagement protrusion 31 are respectively parallel to the right side face 30c and the left side face 30d of the brock to be processed 30.

Since the block holder 33 joined to the block to be processed 30 has the same shape as the block holder 13 according to the first embodiment, the same reference numerals as those shown in FIGS. 2A and 2B are assigned and descriptions will be omitted.

As shown in FIG. 9B, when the engaging protrusion 31 of the block to be processed 30 is engaged so as to be received by the engaging depression 17 of the block holder 33, the block holder 33 is engaged with the block to be processed 30 in a predetermined position. When the engaging protrusion 31 and the engaging depression 17 are engaged with each other, an appropriate gap is provided between these. At joining these, an adhesive is applied to either or both of the engaging protrusion 31 and the engaging depression 17, and the adhesive holding space capable of holding the adhesive corresponds to the above-mentioned gap between the engaging protrusion 31 and the engaging depression 17.

When the block to be processed 30 and the block holder 33 according to the third embodiment are joined, as shown in FIG. 9B, a part of the joint flange 16 of the block holder 33 protrudes sideway from the block-side joint face 30e. That is, this protruding portion is separated from each of the right cutout portion 30g and the left cutout portion 30h, and is a portion that is not involved in joining with the block to be processed 30. Therefore, the block to be processed 30 and the block holder 33 are securely joined by the engagement between the engaging protrusion 31 and the engaging depression 17 and the close contact between the holder-side joint face 14a and the block-side joint face 30e.

As described above, it has been described the third embodiment using the block to be processed 30 on which the right cutout portion 30g and the left cutout portion 30h are formed. If it is clear that the dental prosthesis to be molded is small, the block to be processed itself may be miniaturized (for example, thinned) without providing these cutout portions.

Forth Embodiment

Figure 10A:
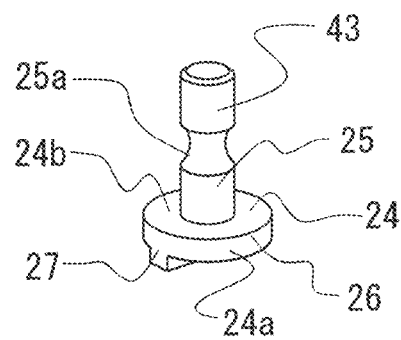
Figure 10A:
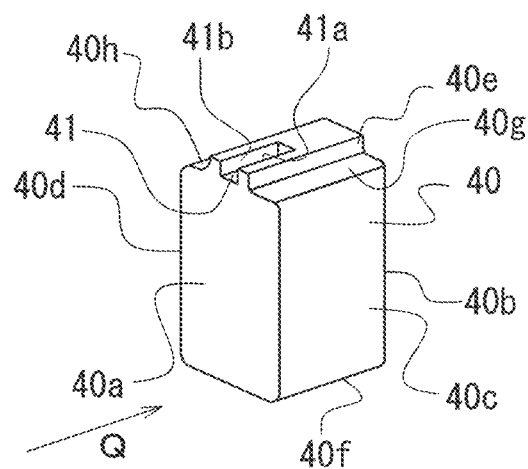
Figure 10B:
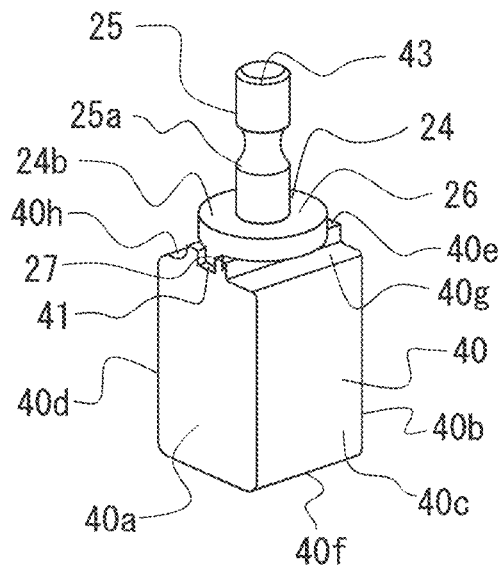

It will be described a joining structure for processing according to the fourth embodiment of the present invention with reference to FIGS. 10A and 10B. FIGS. 10A and 10B show views corresponding to FIGS. 3A and 3B, wherein FIG. 10A shows a perspective view of a state before joining a brock to be processed 40 and a block holder 43 and FIG. 10A shows a perspective view of a state in which the brock to be processed 40 and the block holder 43 are joined. Similarly to the block holder 23 according to the second embodiment, the block holder 43 has the same shape as the shape shown in FIGS. 4A and 4B.

The brock to be processed 40 according to the fourth embodiment is formed in such a shape that an upper edge of a right side face 20c and a left side face 20d of a block-side joint face 20e of a brock to be processed 20 shown in FIGS. 3A and 3B is cut out from a front face 20a toward a bottom face 20f over a rear face 20b That is, as shown in FIGS. 10A and 10B, on the brock to be processed 40 which is made of ceramic, hybrid resin or the like as a raw material and formed into a rectangular parallelepiped or a substantially rectangular parallelepiped, and having a front face 40a corresponding to the front face 20a, a right side face 40c corresponding to the right side face 20c, a left side face 40d corresponding to the left side face 20d, and a bottom face 40f corresponding to the bottom face 20f, a block-side joint face 40e is formed in the central part of the right side face 40c and the left side face 40d on the upper face on the opposite side of the bottom face 40f. A right side cutout portion 40g in which a part of the upper face is cutout is formed at an edge part of the upper face and the right side face 40c, and a left side cutout portion 40h in which a part of the upper face is cutout is formed on an edge part of the upper face and the left side face 40d.

The block-side joint face 40e is provided with an engaging depression 41 as an engaging reception part recessed from the block-side joint face 30e. The engaging depression 41 is formed in a rectangular parallelepiped or a substantially rectangular parallelepiped so that the engaging depression 41 does not interfere with taking out from the molding die at molding of the block to be processed 40 and can be securely joined with the block holder 43. The engaging depression 41 is formed by opening one end to the front face 40a and extending from the opening toward the rear face 40b side. The right side face 41a and the left side face 41b of the engaging depression 41 are respectively parallel to the right side face 40c and the left side face 40d of the brock to be processed 40.

Since the block holder 43 joined to the block to be processed 40 has the same shape as the block holder 23 according to the second embodiment, the same reference numerals as those shown in FIGS. 4A and 4B are assigned and descriptions will be omitted.

As shown in FIG. 10B, when the engaging depression 41 of the brock to be processed 40 is engaged so as to receive the engaging protrusion 27 of the block holder 43, the block holder 43 is positioned at a predetermined position with respect to the brock to be processed 40. When the engaging depression 41 and the engaging protrusion 27 are engaged with each other, a proper gap is provided between these. In the joining, an adhesive is applied to either or both of the engaging depression 41 and the engaging protrusion 27, and the adhesive holding space capable of holding the adhesive corresponds to a gap between the engaging depression 41 and the engaging protrusion 27.

When the brock to be processed 40 and the block holder 43 according to the fourth embodiment are joined, a part of the joint flange 26 of the block holder 43 protrudes laterally from the block-side joint face 40e, as shown in FIG. 10B. That is, the protruded part is separated from each of the right side cutout part 40g and the left side cutout part 40h, and is a part not involved in joining with the brock to be processed 40. Therefore, the block to be processed 40 and the block holder 43 are surely joined by the engagement of the engaging depression 41 with the engaging protrusion 27 and the adhesion between the holder-side joint face 24a and the block-side joint face 40e.

Operation of Third Embodiment and Fourth Embodiment

The brock to be processed 30 according to the third embodiment and the brock to be processed 40 according to the fourth embodiment are formed by filling a molding die (not shown) with a molding material. For taking out the molded brock to be processed 30 from the molding die, the brock to be processed 30 is pressed in the direction of the arrow mark P in FIG. 9A. For taking out the formed brock to be processed 40 out from the molding die, the brock to be processed 40 is pressed in the direction Q of the arrow mark Q in FIG. 10A.

Both the brock to be processed 30 according to the third embodiment and the brock to be processed 40 according to the fourth embodiment have a shape in which the right side cutout portion 30g, 40g and the left side cutout portion 30h, 40h are formed. When the brock to be processed 30, 40 and the block holder 33, 43 are surely joined, the portions corresponding to the cutout portions 30g, 40g and 30h, 40h become parts which can be reduced weight from the brock to be processed 30, 40. That is, with respect to the brock to be processed according to the third embodiment 30, in the case where it can be surely performed the engaging and joining between the engaging protrusion 31 of the brock to be processed 30 and the engaging depression 17 of the block holder 33 and the joining of the block-side joint face 30e and the holder-side joint face 14a, even if the cutout parts 30g, 30h are provided, it does not interfered the stable holding of the brock to be processed 30 on cutting process of the brock to be processed 30. With respect to the brock to be processed 40 according to the fourth embodiment, in the case where can be reliably performed the engaging and joining between the engaging depression 41 of the brock to be processed 40 and the engaging protrusion 27 of the block holder 43 and the joining of the block-side joint face 40e and the holder-side joint face 24a, even if the cutout parts 40g, 40h are provided, it does not interfered the stable holding of the brock to be processed 40 on cutting process of the brock to be processed 40. Moreover, even when the dental prosthesis 1 is processed from the brock to be processed 30, 40, there is no trouble in forming the outer shape of a dental prosthesis 1, a joint 1a, a holding rod 1b, and the like. Therefore, it can be reduced the material of the parts of the cutout portions 30 g, 30h, 40g, 40h. In particular, the cost increase can be suppressed in the brocks to be processed 30, 40 formed of expensive materials.

Modified Embodiment of Third Embodiment

In FIGS. 11A to 11K, brocks to be processed provided with engaging protrusions in various shapes are exemplified, wherein the number and shape of the engaging protrusions 31 of the brock to be processed 30 are different from each other. It will be described as that, for each of the brocks to be processed of various shapes shown in FIGS. 11A to 11K, the main body excluding the engaging protrusion 31 of the brock to be processed 30 is shown by a block body 6, and various engaging protrusions 7 are formed on the block body 4. The number and shape of the engaging protrusions 7 shown in FIGS. 11A to 11K correspond to that of the engaging protrusion 5 shown in FIGS. 6A to 6K.

In either of the block bodies 6 shown in FIGS. 11A to 11K, a left side cutout portion 6g and a right side cutout portion 6h are formed by cutting out an upper end of a right side face 6c and a left side face 6d. An engaging protrusion 7 is formed on a block-side joint face 6e of a part between the left side cutout portion 6g and the right side cutout portion 6h. The block body 6 has a front face 6a and a rear face 6b.

Figure 11A:
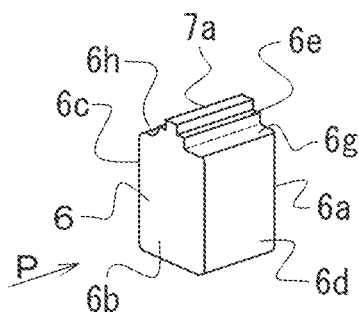
FIGS. 11A to 11K are perspective views of dental CAD/CAM blocks showing various modifications of the engaging part of the third embodiment shown in FIGS. 9A and 9B.
Figure 11B:
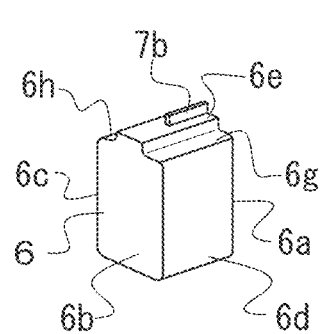
Figure 11C:
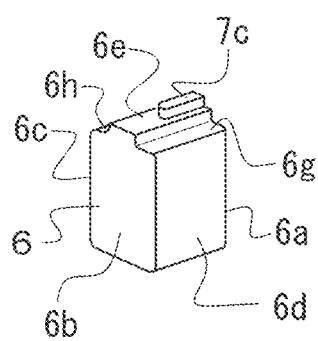
Figure 11D:
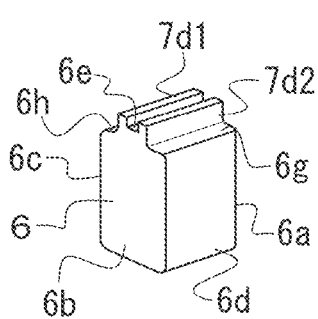
Figure 11E:
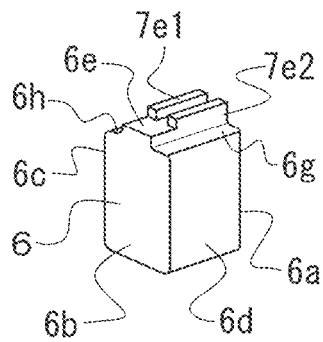
Figure 11F:
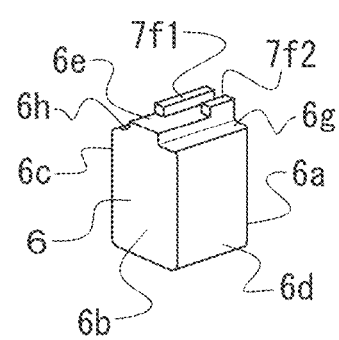
Figure 11G:
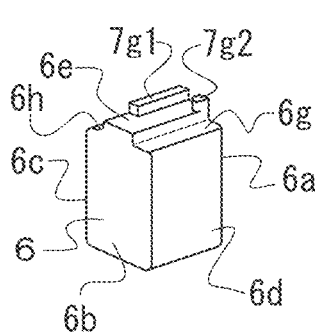
Figure 11H:
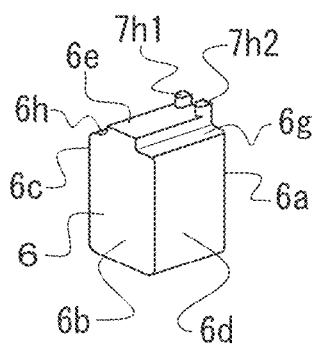
Figure 11I:
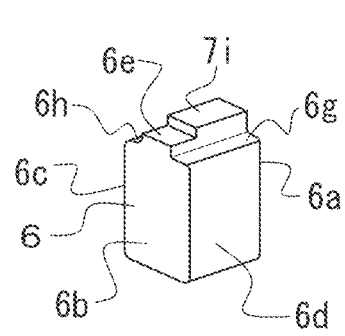
Figure 11J:
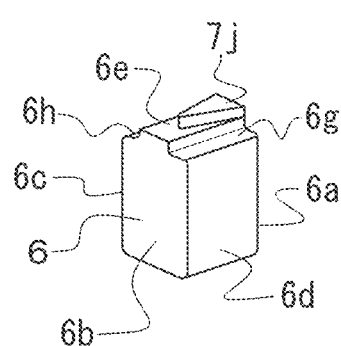
Figure 11K:
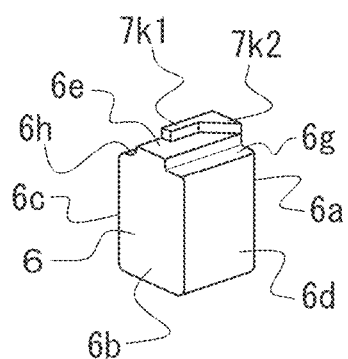

FIG. 11A shows an engaging protrusion 7a which corresponds to the engaging protrusion 5a shown in FIG. 6A;

FIG. 11B shows an engaging protrusion 7b which corresponds to the engaging protrusion 5b shown in FIG. 6B;

FIG. 11C shows an engaging protrusion 7c which corresponds to the engaging protrusion 5c shown in FIG. 6C;

FIG. 11D shows engaging protrusions 7d1 and 7d2 which correspond to the engaging protrusions 5d1 and 5d2 shown in FIG. 6D;

FIG. 11E shows engaging protrusions 7e1 and 7e2 which correspond to the engaging protrusions 5e1 and 5e2 shown in FIGS. 6A to 6K (E);

FIG. 11F shows engaging protrusions 7f1 and 7f2 which correspond to the engaging protrusions 5f1 and 5f2 shown in FIG. 6F;

FIG. 11G shows engaging protrusions 7g1 and 7g2 which correspond to the engaging protrusions 5g1 and 5g2 shown in FIG. 6G;

FIG. 11H shows engaging protrusions 7h1 and 7h2 which correspond to the engaging protrusions 5h1 and 5h2 shown in FIG. 6H;

FIG. 11I shows an engaging protrusion 7i which corresponds to the engaging protrusion 5i shown in FIG. 6I;

FIG. 11J shows an engaging protrusion 7j which corresponds to the engaging protrusion 5j shown in FIG. 6J; and FIG. 11K shows engaging protrusions 7k1 and 7k2 which correspond to the engaging protrusions 5k1 and 5k2 shown in FIG. 6K.

With respect to the engaging protrusion 7 shown in FIGS. 11A to 11K, the joint between the block body 6 and the block holder 33 can be surely performed by satisfying the conditions 1 to 3 described above in the same manner as the engaging protrusion 5 shown in FIGS. 6A and 6K.

Any block body 6 provided with the engaging protrusion(s) 7 shown in FIGS. 11A to 11K can be taken out from the molding die by pushing out the direction indicated by the arrow mark P in FIG. 11A, that is, from the rear face 6b side to the front face 6a side.

The examples shown in FIGS. 1A and 1B are that formed with the engaging protrusion 7 as engaging parts, so that each of these block bodies 6 are to be pushed out from the rear face 6b side to the front face 6a side for taking out from the molding die. On the other hand, in the case where the engaging depression 41 shown in the fourth embodiment is formed on the block body 6 instead of the engaging protrusion 7, the block body 6 is pushed out from the front face 6a side to the rear face 6b side, that is, by pushing out the block body 6 in the direction of the arrow mark P, to be taken out from the molding die.

Even when the block body 6 is provided with an engaging depression similar to the engaging depression 41 shown in the fourth embodiment, the joint between the block body 6 and the block holder 43 can be surely performed by satisfying the condition 1 to condition 3 in the engaging depression part.

(Shape of Dental CAD/CAM Block)

Figure 12:
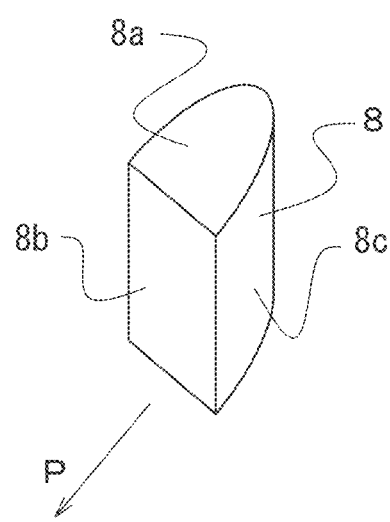
FIG. 12 is a perspective view showing a modified example of the outer shape of a dental CAD/CAM block having a joining structure for processing according to the present invention.

FIGS. 12 to 14 show modified examples of the shapes of the block bodies of the brocks to be processed.

In the modified example shown in FIG. 12, a block-side joint face 8a of a block body 8 is formed into a shape approximately half the center of an elliptic shape or a flat circular shape, and a side face 8c crossing a front face 8b and a block-side joint face 8a is provided in a curved face shape. When an engaging protrusion is to be provided as an engaging part in the block body 8, it is provided along the radial direction of an elliptical axial direction or a flat circular shape from the front face 8b toward the rear. On the other hand, when an engaging depression is to be provided, it is provided from a top part of the elliptical shape or the flat circular shape toward the front face 8b. Thus, the block body 8 can be smoothly taken out from the molding die by sliding the block body 8 in the direction of the arrow mark P in FIG. 12.

Fifth Embodiment

Figure 13A:
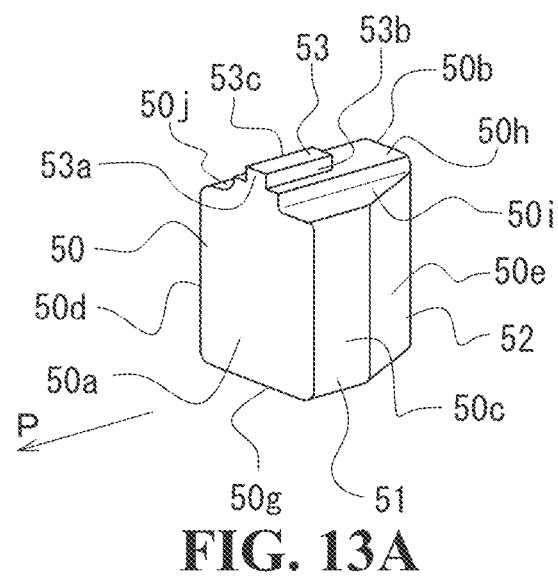
Figure 13B:
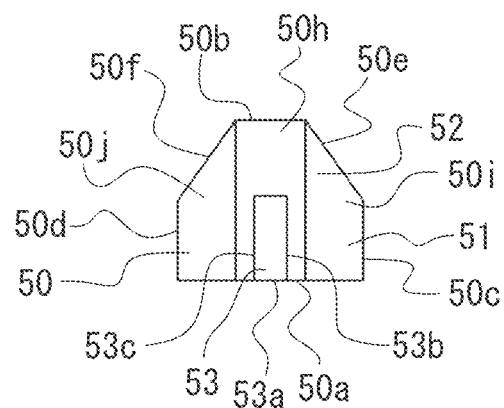

FIGS. 13A and 13B show a joining structure for processing according to a fifth embodiment of the present invention, wherein FIG. 11A is a perspective view seen from the side of a front face 50a, and FIG. 11B is a plan view. A brock to be processed 50 according to the fifth embodiment is formed of a material such as a ceramic or a hybrid, and is joined to a block holder (not shown) similar to the block holder 13 according to the first embodiment.

The brock to be processed 50 comprises a front side portion 51 shaped as a rectangular parallelepiped or a substantially rectangular parallelepiped and including a front face 50a, and a columnar rear side portion 52 having a trapezoidal or substantially trapezoidal cross-section continuous at a lower bottom portion on the front side portion 51. A rear face 50b is present in the rear side portion 52. Thereafter, the face 50b is a portion of the upper bottom of the trapezoidal or substantially trapezoidal cross-section of the rear side portion 52. A front right side face 50c and a front left side face 50d, which are side faces, are formed on the front side portion 51. A rear right side face 50e, which is a side face continuing to the front right side face 50c of the rear side portion 52, is provided, and a rear left side face 50f which is a side face continuing to the front left side face 50d is provided. On the brock to be processed 50, a bottom face 50g is formed continuously from the bottom face of the front side portion 51 and the rear side portion 52, and a block-side joint face 50h serving as a first joint face is formed on the upper face opposite to the bottom face 50g. On the edge of the upper face and the front right side face 50c, a right side cutout portion 50i is formed in which a part of the upper face is cut out, and similarly, a left side cutout portion 50j in which a part of the upper face is cut out is formed at an edge part of the upper face and the front left side face 50d.

The block-side joint face 50h is provided with an engaging protrusion 53 as an engaging part projecting from the block-side joint face 50h. The engaging protrusion 53 is formed in a rectangular parallelepiped or a substantially rectangular parallelepiped so that the engaging protrusion 53 does not interfere with taking out from the molding die at molding of the block to be processed 50 and can be securely joined with the block holder (not shown). A front face 53a of the engaging protrusion 53 is arranged in the same plane as the front face 50a of the block to be processed 50 and is formed so as to extend from an end part where the front face 50a is formed toward a rear face 50b side. The right side face 53b and the left side face 53c of the engaging protrusion 53 are respectively parallel to the front right side face 50c and a front left side face 50d of the brock to be processed 50.

As described above, the block holder joined to the brock to be processed 50 can be used having the same shape as that of the block holder 13 according to the first embodiment.

The brock to be processed 50 can be taken out from the molding die when molding by sliding the brock to be processed 50 in direction of an arrow mark P with respect to the molding die (not shown).

On the other hand, when an engaging depression as an engaging reception part is formed in place of the engaging protrusion 53 on the brock to be processed 50, the end part of the engaging depression is opened to the rear face 50b. The opposite end is formed so as to extend toward the front face 50a side. In the case of the brock to be processed 50 provided with the engaging depression, the brock to be processed 50 can be taken out from the molding die by sliding the brock to be processed 50 in the direction of the arrow mark P in FIG. 13A.

Modified Example of Fifth Embodiment

A brock to be processed 60 shown in FIG. 14 is a modification example of the brock to be processed 50 according to the fifth embodiment shown in FIGS. 13A and 13B, and the same parts with the brock to be processed 50 are assigned same reference numerals. The brock to be processed 60 has a shape in that a plane part of the cross-sectional trapezoid or substantially trapezoidal side face of the rear side portion 52 of the brock to be processed 50 is deformed into a curved face of a part of an arc. The same reference numerals are assigned to the same part as the brock to be processed 50.

That is, as shown in FIG. 14, the rear right side face 50e and the rear left side face 50f of the block to be processed 50 shown in FIGS. 13A and 13B are replaced by a rear right side face 60a and a rear left side face 60b respectively, each having a curved face of a part of an arc.

The block to be processed 60 can be taken out from the molding die in FIG. 14 by sliding it with respect to the molding die in the arrow P direction shown in FIGS. 13A and 13B.

Comparative Example

FIGS. 15A and 15B show a comparative example of a joining structure for processing. In this comparative example, a block-side joint face 101 formed in a plane is arranged on one face of a brock to be processed 100 formed in a rectangular parallelepiped or a substantially rectangular parallelepiped, and a block holder 110 is joined to the block-side joint face 101.

The block holder 110 is formed by integrally forming a disk-shaped base part 111 and a columnar holding support part 112. The face on one side of the base part 111 is a planar holder-side joint face 111a, and a holding prop 112 whose diameter is smaller than that of the base part 111 is erected at or near the center of the other side face. The base part 111 is formed with a cutout portion 111b cut out in a proper length and width in the radial direction from the edge part. A chuck part 112a which is curved by being curved is formed at an intermediate part of the holding prop 112.

An adhesive is applied to one of the block-side joint face 101 and the holder-side joint face 111a, and the block holder 110 is placed on the block-side joint face 101 of the brock to be processed 100 by using a robot arm or the like. Then, the adhesive is cured to produce a joined body of the brock to be processed 100 and the block holder 110 as shown in FIG. 15B.

The joined body is served to a block fixing tool (not shown), then a positioning member (not shown) such as a projection or the like, provided in a block fixing tool, is inserted from the side of the holding prop 112 into the cutout portion 111b of the base part 111. Thus, the block holder 110 with respect to the block fixing tool is positioned, the brock to be processed 100 in a predetermined positional relation with the block holder 110 is positioned relative to the block fixing tool, and the block fixing tool is set to the predetermined positional relation.

Then, it is subjected to cut processing by a cutting machine to produce the dental prosthesis 1.

Since the cutout portion 111b according to the comparative example is formed by a cutout penetrating the base part 111 from one face side to the other face side, there is a risk that the adhesive for joining the brock to be processed 100 and the block holder 110 may infiltrate the cutout portion 111b. When the infiltrated adhesive is cured, the cutout portion 111b is closed, and it may happen a risk that the positioning member of the block fixing tool cannot be inserted.

In contrast, in each of the first embodiment, the second embodiment, the third embodiment, and the fourth embodiment, since the holder-side joint face 14a, 24a side of the positioning recess 18, 28 is closed, the adhesive applied to the holder-side joint face 14a, 24a is prevented from entering the positioning recess 18, 28, and the positioning member is reliably inserted into the positioning recess 18, 28.

The brocks to be processed 10, 20, 30, 40, 50, 60 and the block bodies 4, 6, 8 or the like according to the respective embodiments described above are made of a single layer. On the other hand, it may be used a laminate comprising a plurality of hybrid resin layers for these brocks to be processed 10, etc. or the block bodies 4, etc. When such a laminate is used, at least one kind of property selected from the group consisting of color tone, transparency, refractive index of the matrix polymer and/or the filler constituted, strength, hardness, elastic modulus, abrasion resistance, fluorescent property, and polishing property can be made preferably different from each other. he dental prosthesis having a color tone pattern with high aesthetic properties can be obtained by different properties such as color tones for the respective layers.

As described above, according to the joining structure for processing according to the present invention, the dental CAD/CAM block and the block holder are surely joined to perform cutting processing of the dental CAD/CAM block and contribute to suppress the occurrence of defective products.

The invention claimed is:

1. A joining structure for processing comprising a dental CAD/CAM block to be processed by a machine for producing a dental product and a block holder joined to the dental CAD/CAM block to hold it and to fix it to a cutting machine, further comprising:

an engaging part formed by one or a plurality of engaging protrusions protruding from a first joint face that is either one of a joint face of the dental CAD/CAM block and a joint face of the block holder;

an engagement reception part formed by one or a plurality of engaging depressions depressed from a second joint face that is the other of the joint face of the dental CAD/CAM block and the joint face of the block holder to receive the one or a plurality of engaging protrusions respectively;

an adhesive holding space configured to hold an adhesive between an engaging part and an engaging reception part so as to contact 50% or more of the surface area of the surface of the engaging part and 50% or more of the surface area of the surface of the engaging reception part come with the adhesive respectively;

the engaging part and the engaging reception part being engaged with each other, and the dental CAD/CAM block and the block holder being joined by the adhesive held in the adhesive holding space;

the dental CAD/CAM block is provided in a rectangular parallelepiped shape, and one of bottom faces thereof is the joint face;

the engaging part or the engaging reception part is formed, when defining one face arbitrarily from the four rectangular parallelepiped side faces as the front face, the opposite face as a rear face, and the faces adjacent to the right and left sides toward the front face as a right side face and a left side face respectively, that one end face of the engaging part or the engaging reception part is on the same plane as the front face and extends toward the rear face direction;

the engaging part or the engaging reception part is shaped, in a coordinate system in which a shared vertex of the other bottom face of the rectangular parallelepiped shape, the front face and the right side face is defined as an origin, x, y and z axes arranged along the first side shared by the other bottom face and the right side face, the second side shared by the other bottom face and the front face, and the third side shared by the front face and the right side face respectively and coordinates (x, y, z) of the end opposite the origin on the first, second and third sides are (100,0,0), (0, 100,0), and (0, 0, 100) respectively, as satisfy the following conditions; that (1) when the value of the x coordinate of the side end of the rear face is defined for each engaging part or each engaging reception part of the one or a plurality of engaging protrusions or the one or more of engaging depressions as L, the length of that engaging part or engaging reception part, and the maximum value therein is defined as Lmax, the maximum length of the one or a plurality of engaging protrusions or the one or more of engaging depressions, then:

$95 \geq Lmax \geq 10$;

(2) when the x coordinate value of each engaging part or each engagement reception part of the one or a plurality of engaging protrusions or the one or a plurality of engaging depression parts is p (where p is 0 or more and L or less rational number), and the y coordinate value is q (where q is an arbitrary y coordinate value in a region where the engaging part or the engaging reception part exists when x=p), then the height of that engaging part or the depth of that engaging reception part Hp,q is, in actual size:

$10 \, [mm] \geq H_{0,q} > 0.1 \, [mm]$ when p=0, and $H_{p-r, q} \geq H_{p,q}$ when p>0, where r is an arbitrary rational number of more than 0 and less than p;

the block holder includes:
 a plate-shaped base part on which one face is set as the first joint face or the second joint face and joins to the joint face of the dental CAD/CAM block, and the other face is a holding side face;
 an holding prop is erected in the center of the holding side face of the base part; a joint flange is provided around the holding prop by a part of the base part extending in a sword guard shape from the holding prop; and
 a positioning recess is provided in an appropriate depth from the holding-side face of the joint flange along the axial direction of the holding prop, and from the peripheral edge portion of the joint flange toward the holding prop, in the circumferential direction, for engaging with a positioning tool of a cutting machine cutting the dental CAD/CAM block, wherein
 the positioning recess has no portion penetrating the base part from the holding side face to the joint face of the block holder, and the planar shape size of the joint face of the dental CAD/CAM block is larger than the planar shape size of the joint face of the block holder.

2. The joining structure for processing according to claim 1, wherein: the dental CAD/CAM block is a laminated body composed of a plurality of layers, and each layer is a hybrid resin layer having different property from others.

3. The joining structure for processing according to claim 1, wherein: the following conditions (3) is satisfied;

(3) when the x coordinate value of each engaging part or each engaging reception part of the one or a plurality of engaging parts or the one or more engaging reception part is p (where p is 0 or more and L or less rational number), and when the width of each engaging part or each engaging reception part is Wn defined by the absolute value of the difference between the value of the y coordinate of one end part of that engaging part or engaging reception part and the value of the y coordinate of the other end part thereof, then the sum of the width Wn of all the engaging parts or the engaging reception parts is 1 or more and 70 or less, and the width Wn of all the engaging parts or the engaging reception parts are:

$70 \geq W_0 \geq 1$ when P=0, and $W_{p-r} \geq W_p$ when p>0, where r is an arbitrary rational number of more than 0 and equal to or less than p.

* * * * *